United States Patent
Kumasawa et al.

(10) Patent No.: US 7,730,235 B2
(45) Date of Patent: Jun. 1, 2010

(54) STORAGE APPARATUS FOR CONTROLLING POWER SAVING MODES OF MULTIPLE DISK DEVICES OF DIFFERENT SPECIFICATIONS

(75) Inventors: Hiroyuki Kumasawa, Odawara (JP); Takashi Chikusa, Odawara (JP); Satoru Yamaura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/580,105

(22) Filed: Oct. 11, 2006

(65) Prior Publication Data
US 2008/0126616 A1 May 29, 2008

(30) Foreign Application Priority Data
Aug. 10, 2006 (JP) .............................. 2006-218292

(51) Int. Cl.
*G06F 3/00* (2006.01)
*G06F 5/00* (2006.01)
(52) U.S. Cl. .............................. 710/36; 710/40; 710/42
(58) Field of Classification Search .................... 710/42
See application file for complete search history.

(56) References Cited
U.S. PATENT DOCUMENTS 5,423,046 A * 6/1995 Nunnelley et al. .......... 713/330
7,047,354 B2   5/2006 Yagisawa et al.
7,171,500 B2 * 1/2007 Day et al. ................... 710/106
2003/0115413 A1 6/2003 Wood et al.
2003/0193732 A1 10/2003 Hakamata et al.
2004/0236908 A1 11/2004 Suzuki et al.
2005/0010831 A1 * 1/2005 Bashford et al. ............ 713/323
2005/0144383 A1 6/2005 Higaki et al.
2005/0160221 A1 * 7/2005 Yamazaki et al. ........... 711/114
2005/0235171 A1 * 10/2005 Igari .......................... 713/323
2007/0079063 A1 * 4/2007 Mizuno ...................... 711/112
2007/0192639 A1 * 8/2007 Nichols et al. .............. 713/300

FOREIGN PATENT DOCUMENTS

GB      2395820 A      6/2004
JP    2000-293314 A    10/2000
JP    2004-348876 A    12/2004

* cited by examiner

*Primary Examiner*—Niketa I Patel
*Assistant Examiner*—Brooke J Dews
(74) *Attorney, Agent, or Firm*—Sughrue Mion, PLLC

(57) ABSTRACT

A storage apparatus is provided that is capable of reducing data maintenance management costs with a performance that is both highly reliable and fast. The present invention is storage apparatus where an intermediary device is arranged between a controller and a plurality of disk devices of different performances arranged in a hierarchical manner. The controller unit carries out I/O accesses to and from the disk devices via the intermediary devices based on access requests sent from host apparatus. The intermediary device includes a power saving control function for the disk device and carries out operation control such as spin off and spin up of disk devices in accordance with conditions set in advance.

19 Claims, 36 Drawing Sheets

FIG.5

| Port No. | CONNECTION TYPE | CONNECTION SECTION | I/F TYPE | PM STATUS | TRANSITION DATE | TRANSITION TIME | I/O PER MINUTE | TRANSITION WAIT TIME | TRANSITION TABLE |
|---|---|---|---|---|---|---|---|---|---|
| 0 | EndDevice | TARGET | SAS | Active | 2006/XX/14 | 6:30:00 | 9000 | - | N/A |
| 1 | EndDevice | TARGET | SAS | Active | 2006/XX/14 | 6:30:00 | 0 | 0:00:30 | Standby |
| 2 | EndDevice | TARGET | SAS | Active | 2006/XX/14 | 6:30:00 | 9000 | : | N/A |
| 3 | EndDevice | TARGET | SAS | Sleep | 2006/XX/14 | 9:00:00 | 0 | : | N/A |
| 4 | EndDevice | TARGET | SAS | Active | 2006/XX/13 | 0:00:00 | 0 | 2:05:00 | Sleep |
| : | : | : | : | : | : | : | : | : | : |
| 14 | EndDevice | TARGET | SATA | Sleep | 2006/XX/13 | 0:30:00 | 0 | 0:10:00 | Active |
| 15 | N/A | - | - | - | - | - | - | - | - |
| 16-19 | EdgeExpander | INTERMEDIARY DEVICE | - | Active | 2005/YY/03 | 9:50:00 | 30000 | - | 9:50:00 |
| 20-23 | EdgeExpander | INTERMEDIARY DEVICE | - | Active | 2005/YY/03 | 9:50:00 | 30000 | - | 9:50:00 |
| 24-27 | EndDevice | Initiator | SAS | Active | 2005/YY/03 | 9:50:00 | 100000 | - | 9:50:00 |
| 28-31 | EndDevice | Initiator | SAS | Active | 2005/YY/03 | 9:50:00 | 100000 | - | 9:50:00 |

FIG.8

SYSTEM CONFIGURATION INFORMATION

| ACCESS STANDBY TIME |
| MINIMUM NUMBER OF ACTIVE DRIVES |
| RESTART INTERVAL |
| TOTAL I/O ACCESS COUNT |

|   |   | SAS | SATA |
|---|---|---|---|
| 1 | MOTOR SPIN UP | Unit Start | IDLE IMMEDIATE/ DEVICE RESET |
| 2 | MOTOR SPIN OFF | Unit Stop | STANDBY IMMEDIATE |
| 3 | POWER SAVING | - | SLEEP |
| 4 | ACK RESPONSE | - | - |
| 5 | HDD RESPONSE | Good/Not Ready/etc. | Good/Not Ready/etc. |
| 6 | Ready Check | Test Unit Ready | CHECK POWER MODE |
| 7 | ESTABLISH LINK | - | - |

FIG.17

| Sequence No. | FLAG | FOR CONTROLLER REQUESTS ||| FOR CACHING |||
| | | WR Port | LBA | Data Length | RD Port | LBA | Data Length |
|---|---|---|---|---|---|---|---|
| 1 | CACHING COMPLETE | 0 | 100 | 80 blocks | 5 | 80000 | 80 blocks |
| 2 | CACHING COMPLETE | 0 | 180 | 200 blocks | 5 | 80080 | 200 blocks |
| 3 | CACHING COMPLETE | 1 | 100 | 100 blocks | 5 | 80280 | 100 blocks |
| - | AVAILABLE | - | - | - | - | - | - |
| .. | .. | .. | .. | .. | .. | .. | .. |

FIG.19

| | Block No. | FLAG | Sequence No. | WR PORT | LBA | Data Length |
|---|---|---|---|---|---|---|
| FOR CACHING | 0 | CACHING COMPLETE | 1 | 0 | 100 | 80 blocks |
| | 1 | CACHING COMPLETE | 2-1 | 0 | 180 | 200 blocks |
| | 2 | LINK FOR 2-1 | 2-2 | - | .. | - |
| | 3 | AVAILABLE | .. | .. | .. | .. |
| | 4 | CACHING COMPLETE | .. | 1 | 100 | 100 blocks |
| | .. | .. | .. | .. | .. | .. |

FOR CONTROLLER REQUESTS

FIG.20

|   |                | Out Of Band (OOB) | Ordered Set    |
|---|----------------|-------------------|----------------|
| 1 | MOTOR SPIN UP  | -                 | PMG_CMD_SPNUP  |
| 2 | MOTOR SPIN OFF | -                 | PMG_CMD_STDBY  |
| 3 | POWER SAVING   | -                 | PMG_CMD_SLEEP  |
| 4 | ACK RESPONSE   | -                 | PMG_MSG_ACCPT  |
| 5 | HDD RESPONSE   | -                 | PMG_MSG_AWAKE  |
| 6 | Ready Check    | -                 | PMG_CMD_RPRDY  |
| 7 | ESTABLISH LINK | COMINIT           | -              |

FIG.21A | K28.5 | Dxx.y | Dxx.y | Dxx.y |

FIG.21B | K28.3 | Dxx.y | Dxx.y | Dxx.y |

FIG.23

| Flag | CMD_CODE | Primitive Name | CONTENT |
|---|---|---|---|
| 4 | 1 | PMG_CMD_SPNUP | MOTOR SPIN UP (USE OF OOB FROM SLEEP STATE) |
| 4 | 2 | PMG_CMD_STDBY | MOTOR SPIN OFF (I/F LINE IS ACTIVE) |
| 4 | 3 | PMG_CMD_SLEEP | MOTOR SPIN OFF (I/F LINE IS INACTIVE) |
| 6 | 4 | PMG_CMD_RPRDY | START UP NOTIFICATION REQUEST |
| 1/3 | 1-3/4 | PMG_MSG_ACCPT | COMMAND RECEIPT RESPONSE (RECEIPT FLAG AND CMD_CODE AT PARAMETER FIELD) |
| 3 | F | PMG_MSG_AWAKE | START UP NOTIFICATION RESPONSE (START UP TIME VALUE AT PARAMETER FIELD) |
| C | 0 | PMG_VER_REQID | VERSION ARBITRATION USE (ISSUING) |
| B | 5 | PMG_VER_ACKID | VERSION ARBITRATION USE (RESPONDING) |

NOTE: THE VALUES IN THE TABLE ARE HEXADECIMAL PRIOR TO 8b/10b CONVERSION

FIG.29

|   | | Out Of Band (OOB) | Ordered Set |
|---|---|---|---|
| 1 | MOTOR SPIN UP | - | PMG_CMD_SPNUP |
| 2 | MOTOR SPIN OFF | - | PMG_CMD_STDBY |
| 3 | POWER SAVING | - | PMG_CMD_SLEEP |
| 4 | ACK RESPONSE | - | PMG_MSG_ACCPT |
| 5 | HDD RESPONSE | - | PMG_MSG_AWAKE |
| 6 | Ready Check | - | PMG_CMD_RPRDY |
| 7 | ESTABLISH LINK | COMINIT | - |
| 8 | OTHER SYSTEM CONFIRMATION | - | PMG_MSG_SLEEP |
| 9 | DENIAL RESPONSE | - | PMG_MSG_ADNEY |

TIME DIFFERENCE POWER SUPPLY TURNED ON

STORAGE APPARATUS FOR CONTROLLING POWER SAVING MODES OF MULTIPLE DISK DEVICES OF DIFFERENT SPECIFICATIONS

This application relates to and claims priority from Japanese Patent Application No. 2006-218292, filed on Aug. 10, 2006, the entire disclosure of which is incorporated herein by reference.

BACKGROUND OF THE INVENTION

1. Field of the Invention

The present invention relates to storage apparatus and a data management method employing this storage apparatus, and particularly relates to technology for controlling power saving of a disk device.

2. Description of Related Art

The amount of data processed by computer systems is increasing evermore in accompaniment with the advancement of hardware technology. This storage apparatus is the core of a computer system managing vast amounts of data.

During the installation and operation of storage apparatus, there is typically a demand to keep data maintenance management costs down. Data maintenance management costs typically include cost (i.e., bit cost) per bit and power consumption costs in operation.

Technology combining disk devices having distinct performance in order to reduce bit cost while fulfilling the specifications demanded of storage apparatus is well known. For example, as shown in patent document 1 described below, it is known in the art as a storage apparatus that large capacity low-cost SATA disk devices and high-reliability high cost FC disk devices are combined in a hierarchical manner. High priority data is then stored in FC disk devices, whereas data of a comparatively low priority is stored in SATA disk devices.

In addition, technology for stopping disk devices for which data access has not taken place for a long time in order to reduce power consumption costs in operation is well-known. For example, patent document 2 discloses a storage apparatus that suppress power consumption by limiting operation of disk devices according to the frequency of receiving I/O commands sent from the host apparatus and stopping disk devices of low frequency.

[Patent Document 1] Japanese Patent Laid-open Publication No. 2004-348876.

[Patent Document 2] Japanese Patent Laid-open Publication No. 2000-293314.

SUMMARY OF THE INVENTION

There has been a tendency to increase the number of disk devices mounted on the storage apparatus in accompaniment with demands for increased capacity of the storage apparatus. The system resources required by the controller unit for controlling the disk devices are proportional to the increase in the number of disk devices and there is therefore the fear that control of power consumption for the spin-off and spin-up of the disk devices will influence the original processing performance of the controller for I/O access requests. Such control of power consumption also consumes a large amount of controller memory resources. Increasing the size of the memory with the aim of maintaining processing performance therefore invites cost increases for the overall storage apparatus and runs contrary to the object of cost reduction.

According to an aspect of the present invention, the present invention is a storage apparatus where an intermediary device is arranged between a controller unit and a plurality of disk devices of different performances arranged in a tiered storage manner. The controller unit carries out I/O accesses to and from the disk devices via the intermediary device based on an access request sent from a host apparatus. The intermediary device includes a power saving control function for the disk device and therefore carries out operation control such as stopping and starting up of disk devices in accordance with conditions set in advance.

According to an aspect of the present invention, the present invention is a storage apparatus including a controller unit configured to carry out processing according to an access request from a host apparatus, one or more intermediary devices, connected to the controller unit and having a plurality of ports, and a plurality of disk devices connected respectively to the plurality of ports of one of the intermediary devices. The intermediary device transfers processing according to an access request via any of the plurality of ports selected in accordance with the access requests and carries out power saving control for the disk devices connected to any of the plurality of ports without controlling by the controller unit.

The plurality of disk devices are configured from a first disk device group and a second disk device group having different performance to the first disk device group, typically composed of a SAS specification hard disk device group and a SATA specification hard disk device group.

The intermediary device includes a profile relating to predetermined power management and causes any of the plurality of disk devices to make a transition to power saving mode in accordance with the power saving mode transition conditions defined in the profile relating to the predetermined power management.

According to an aspect of the present invention, the present invention is a method for controlling power saving of a plurality of disk devices. This method for controlling power saving is such that a controller unit receives an access request from host apparatus, and sends an internal access request corresponding to the received access request to the intermediary device. The intermediary device then transfers the access request via one of the plurality of ports of the intermediary device selected in accordance with the access request and carries out control of power saving of disk devices connected to the one of the plurality of ports in accordance with a profile relating to predetermined power management.

According to the present invention, a storage apparatus is provided that is capable of reducing the maintenance and management costs of data with a performance that is both highly reliable and fast, etc.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 5 is a view showing an example of a port management table of the intermediary device of an embodiment of the present invention;

FIG. 8 is a view showing an example of system configuration information stored in memory of the intermediary device of an embodiment of the present invention;

FIG. 10 is a view showing examples of SAS/SATA commands issued by an intermediary device of an embodiment of the present invention;

FIG. 17 is a view showing an example of a metadata table stored in the intermediary device of an embodiment of the present invention;

FIG. 19 is a further view showing an example of a metadata table stored in the intermediary device of an embodiment of the present invention;

FIG. 20 is a view showing an example of an ordered set of an embodiment of the present invention;

FIGS. 21A and 21B are views each showing an example of an ordered set of an embodiment of the present invention;

FIG. 23 is a view showing an example of commands defined by the power management ordered set of an embodiment of the present invention;

FIG. 29 is another further view showing an example of an ordered set of an embodiment of the present invention;

DESCRIPTION OF THE EMBODIMENTS

The following is a description with reference to the drawings of one or more embodiments of the present invention.

Figure 1:
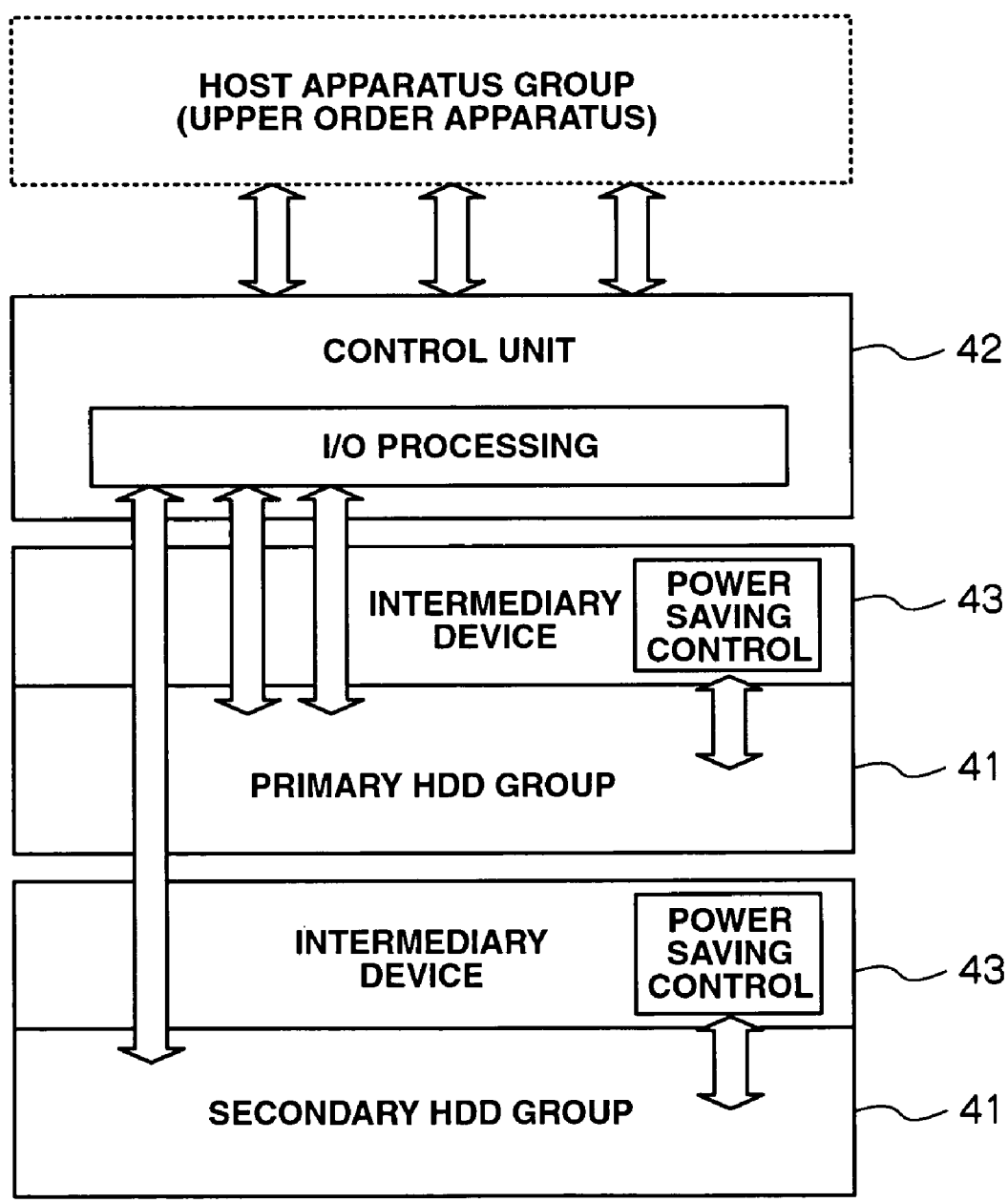
FIG. 1 is an outline view illustrating a storage system of the present invention.

With a storage apparatus of the present invention, as shown in FIG. 1, an intermediary (expander) device 43 is arranged between a controller unit 42 and a plurality of disk devices 41 of different performances arranged in a hierarchical manner. The controller unit 42 then carries out I/O processes for the disk devices 41 via the intermediary device 43 based on access requests sent from a host apparatus. The intermediary device 43 includes a power saving control function for the disk device 41 and carries out operation control such as stopping and starting up of disk devices in accordance with conditions set in advance.

First Embodiment

Figure 2:
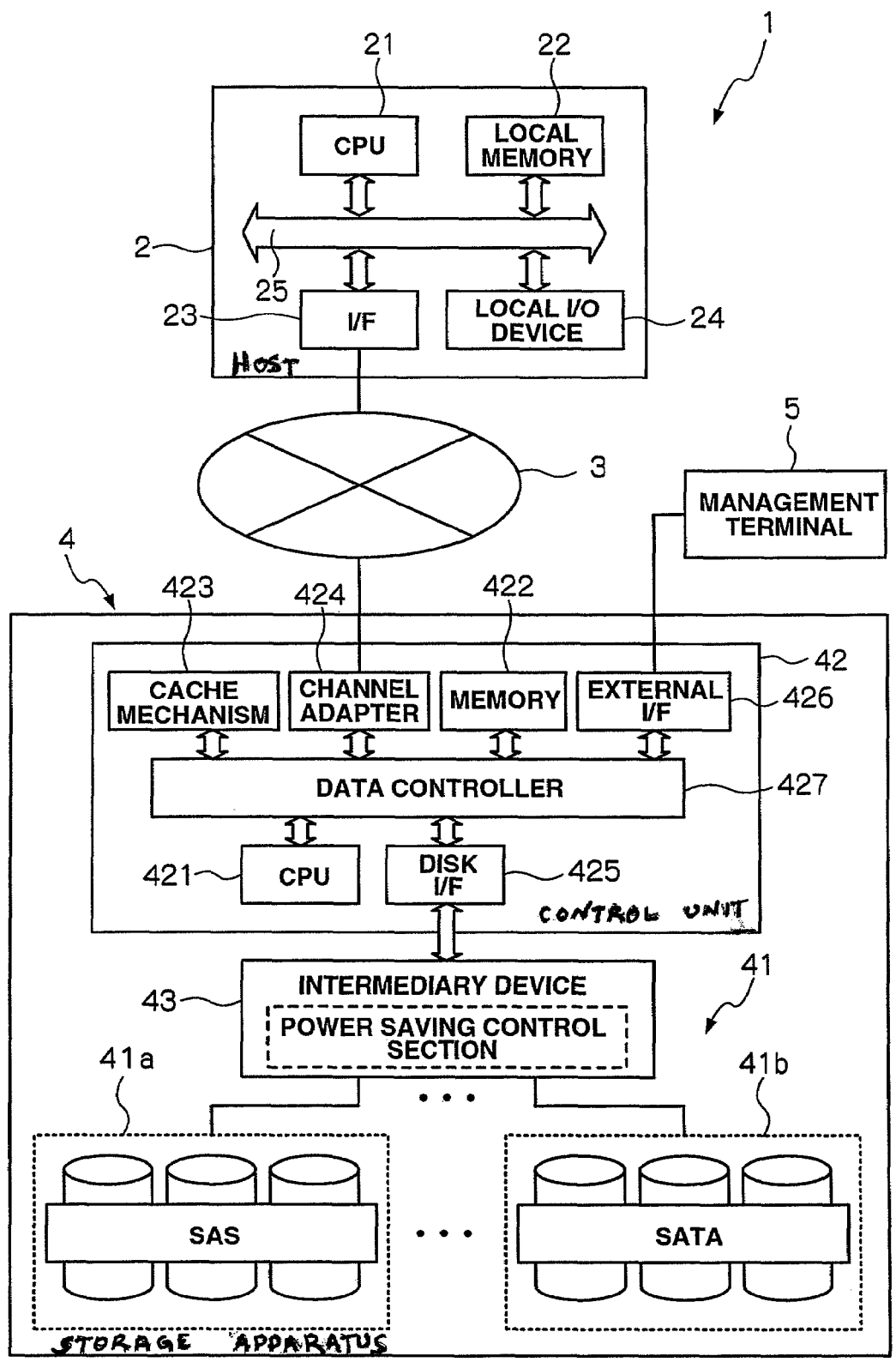
FIG. 2 is a view showing a configuration for a storage system of an embodiment of the present invention.

FIG. 2 shows a configuration for a storage system of an embodiment of the present invention. Referring to FIG. 2, a storage system 1 includes a storage apparatus 4 operatively connected to a host apparatus 2 via a network system 3. The storage system 1 further includes a management terminal 5 operatively connected to the storage apparatus 4.

The host apparatus 2 typically corresponds to a personal computer, workstation, or mainframe, etc. The host apparatus 2 has hardware resources, such as a CPU 21, a local memory 22, an interface 23, and a local input/output device 24, that are operatively connected together by an internal bus 25. The host apparatus 2 includes software resources, such as a device driver, an operating system (OS), and one or more application programs.

The host apparatus 2 executes various programs under the control of CPU 21, and achieves desired processing in cooperation with hardware resources. Typically, the host apparatus 2 executes the application programs on the OS under the control of CPU 21. The application programs are programs configured to achieve processing a user intends to perform using the host apparatus 2. The application programs typically require accesses such as the reading and writing of data to and from the storage apparatus 4 during execution. A storage manager mounted at the host apparatus 2 hands over access requests from the application programs to the storage apparatus 4 as commands, and hands over data read from the storage apparatus 4 to the application programs. The storage manager may be provided separately from the OS or may be incorporated as part of the OS. The programs may be configured as a single module or may be configured as a plurality of modules.

The network system 3 may be configured from, for example, a SAN (Storage Area Network), LAN (Local Area Network), Internet, public line, or dedicated line, etc. Communication between the host apparatus 2 and the storage apparatus 4 is carried out via the network system 3 in accordance with a predetermined protocol. For example, if the network 3 is a Fibre Channel integrated SAN, Fibre Channel protocol can be used. Further, if the network 3 is a LAN, normally, TCP/IP protocol can be used.

The storage apparatus 4 includes the plurality of disk devices 41 (illustrated as groups 41*a* and 41*b*), the controller unit 42 for controlling accesses such as reading and writing to and from the disk device 41, and the intermediary device 43 for transferring access control between the disk devices 41 and the controller unit 42, and carrying out power saving control for the disk device 41. The intermediary device 43 corresponds to the type with the object of so-called "edge type" or "fan-out type" and is configured from one or a plurality of devices according to the number of disk devices 41 connected and the system scale, etc. The intermediary device 43 is capable of being made to be a SAS expander device carrying out communication using SAS protocol. Alternatively, the intermediary device 43 is capable being adopted as a switch for carrying out FC protocol communication.

The management terminal 5 is a computer apparatus used by a system administrator to manage the whole of storage apparatus 4. For example, utility tools for setting power saving control of the storage apparatus 4 are mounted at the management terminal 5, and a user interface is provided to the system administrator. The management terminal 5 may be connected to the storage apparatus 4 using a dedicated line or LAN, or via the network system 3. In this embodiment, the management terminal 5 is externally connected to the storage apparatus 4 but a configuration where the storage apparatus 4 is provided with a service processor (SVP) for managing itself and a user interface is also possible.

The disk devices 41 includes groups of hard disk devices (HDD) of different specifications and types, and are capable of being utilized hierarchically as storage areas according, for example, to the properties of the data to be saved. Specifically, for example, SAS specification hard disk devices (SAS disk devices) are adopted for the tier demanding high performance, and, for example, Serial ATA specification hard disks (SATA disk devices) are adopted for the tier demanding large capacity and low bit cost. In this embodiment, the disk devices 41 are configured from a SAS disk device group 41*a* and a SATA disk device group 41*b*. Each of the disk device 41 is equipped with a port (not shown) respectively connected to ports provided at the intermediary device 43. By way of this configuration, the disk devices 41 carry out access control due to the controller unit 42 via the intermediary device 43 in accordance with predetermined protocols.

One or more logical volumes LU are defined on the storage areas provided by the one or more disk devices 41. In this embodiment, logical volumes SAS-LU are defined on SAS disk device 41*a* and logical volumes SATA-LU are defined on SATA disk device 41*b*.

Unique identifiers (e.g., LUN: Logical Unit Number) are allocated to the logical volumes LU, and the logical volumes are managed using the identifiers. Accesses to the logical volumes LU are carried out in units of blocks of a predetermined size. A logical block address (LBA: Logical Block Address) is allocated to each block. It is then possible for the host apparatus 2 to access blocks on a desired logical volume by designating a logical address with respect to the controller unit 42 of the storage apparatus 4 based on an identifier and logical block address.

The controller unit 42 is a system circuit comprising, among other things, a CPU 421, memory 422, and cache mechanism 423, and mainly controls input and output processing between the host apparatus 2 and the disk devices 41. Further, the controller unit 42 is equipped with one or a plurality of channel adapters 424 and one or a plurality of disk interfaces 425. Moreover, the controller unit 42 is provided with an external interface 426 enabling connection with the management terminal 5. These system modules or elements are operatively connected to a data controller 427.

Figure 3:
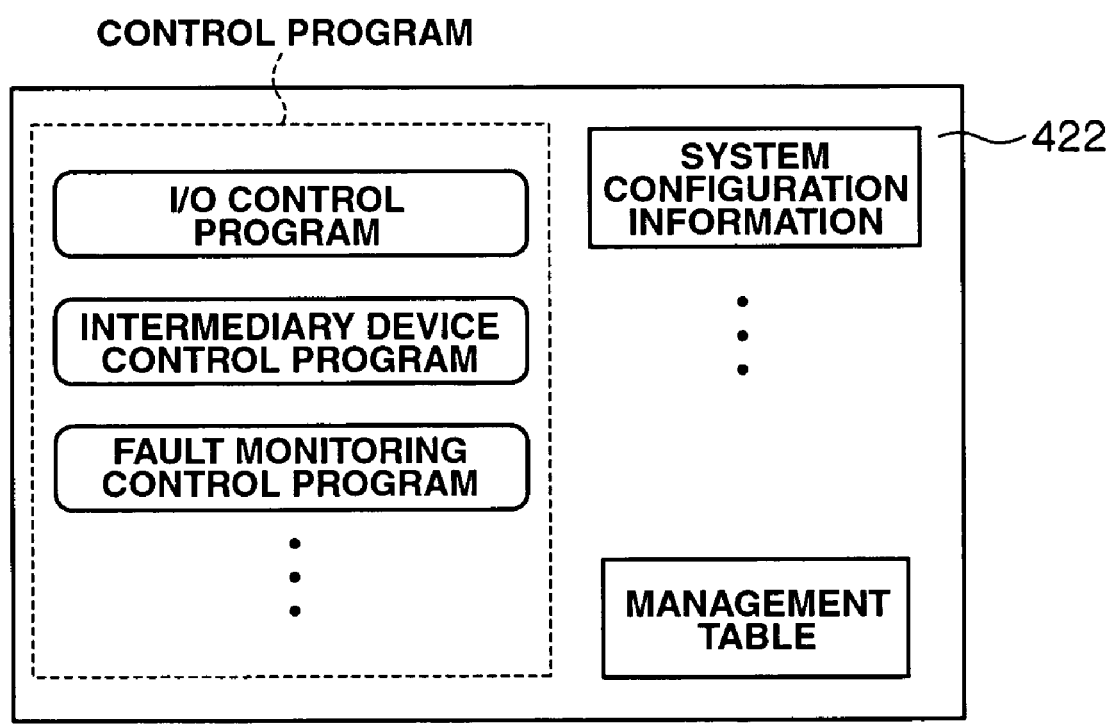
FIG. 3 is a view illustrating the content of memory of a control unit of storage apparatus of an embodiment of the present invention.

The memory 422 functions as main memory of the CPU 421. As shown in FIG. 3, the memory 422 stores various control programs and profiles, such as system configuration information and management tables to be provided for utilization by the CPU 421. In this embodiment, I/O control programs and intermediary device control programs are implemented as control programs. The above control programs and various profiles are, for example, read from a logical volume LU on a specific disk device 41 under the control of the CPU 421 when the storage apparatus 4 is powered on, and thereafter deployed on the memory 422. Alternatively, if the memory 422 is configured to include re-writable non-volatile memory, this is regularly held in the non-volatile memory.

Returning to FIG. 2, the cache mechanism 423 includes a cache memory and is utilized in temporary storage of input/output data for between the host apparatus 2 and the disk device 41. Commands sent from the host apparatus 2 are temporarily held in the cache memory, and also data read out from the disk devices 41 is temporarily held in the cache memory during transmission to the host apparatus 2.

The channel adapter 424, per se, is a system circuit including a microprocessor, a memory, and a communication interface, and provides ports for connecting to the network system 3. The channel adapter 424 interprets and executes the various commands sent from the host apparatus 2 via the network system 3. A network address is allocated to a port of the channel adapter 424. By way of this, each of the individual channel adapters 424 can be identified on the network system 3 and can function as SAN storage and NAS (Network Attached Storage).

The disk interface 425 provides an input/output interface for the intermediary device 43. The controller unit 42 is connected to the intermediary device 43 via the disk interface 425.

The intermediary device 43 includes a plurality of ports 434 (see FIG. 4), and disk devices 41 are connected to each port using a point-to-point method. The intermediary device 43 functions as a certain type of switching device, mediates data communication between the controller unit 42 and the disk devices 41, and carries out switching. The intermediary device 43 of this embodiment is equipped with a power saving control section and carries out power saving control with respect to each disk device 41. The power saving control is control for, for example, controlling stopping of the disk devices 41, and controlling starting up of the stopped disk devices 41. The stopping and starting up control also includes power supply control for spindle motors and power supply control for interface lines. The intermediary device 43 suppresses power consumption at the storage apparatus 4 by appropriately controlling this stopping and starting up in accordance with predetermined conditions.

Communication between the controller unit 42 and the disk devices 41 via the intermediary device 43 adopts protocols according to each type of device. In this embodiment, for example, SSP (Serial SCSI Protocol) and STP (SATA Tunneling Protocol) are used. Further, communication between the controller unit 42 and the intermediary device 43 uses, for example, SMP (Storage Management Protocol).

Figure 4:
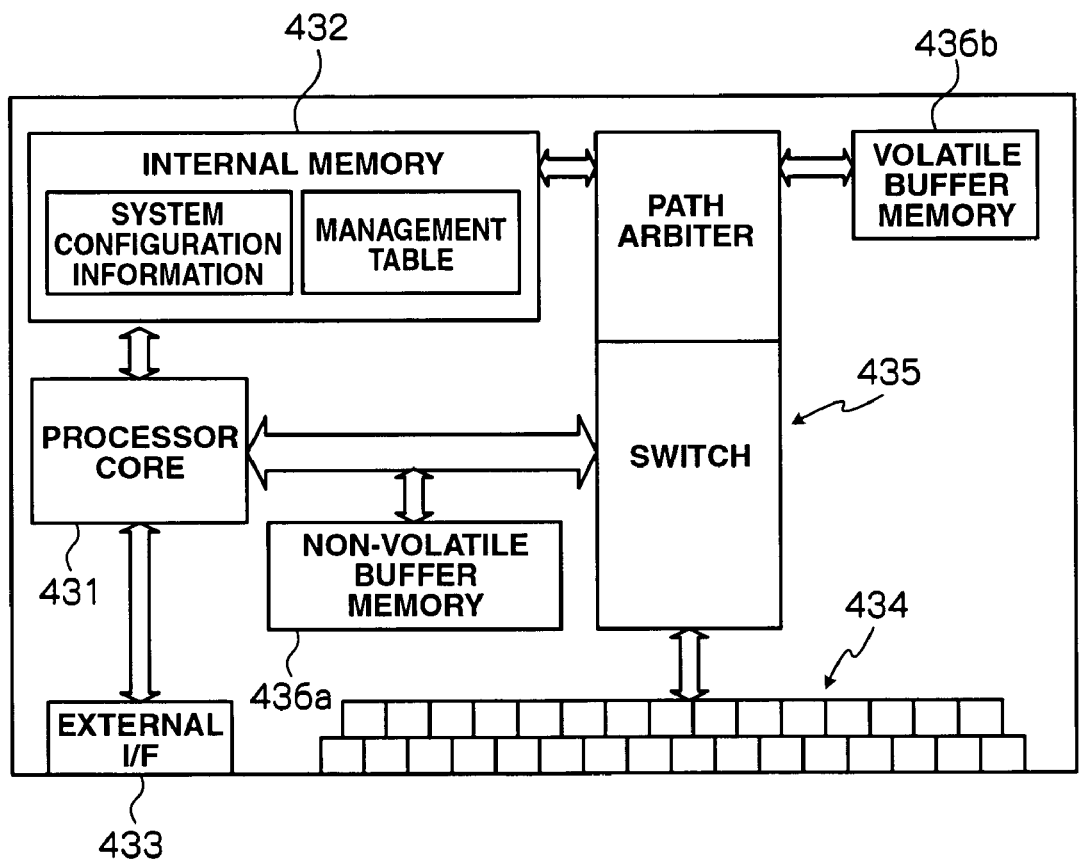
FIG. 4 is a view showing a configuration for an intermediary device of an embodiment of the present invention.

FIG. 4 shows a configuration for the intermediary device 43 of an embodiment of the present invention. Referring to FIG. 4, the intermediary device 43 includes an internal system circuit, and specifically is comprised of a processor core 431, memory 432, external interface 433, port 434, port switching mechanism 435, and buffer memories 436a and 436b, which are operatively connected.

The processor core 431 controls the intermediary device 43 in accordance with predetermined control sequences stored in memory 432 functioning as main memory. For example, the processor core 431 interprets commands on the SAS/SATA protocol, and hands the commands over to a device of the next stage (i.e., controller unit 42 or disk devices 41).

The memory 432 holds profiles for system configuration information and a port management table, etc. The processor core 431 detects each type of devises (disk devices 41, etc.) connected to the ports 434 via an initialization sequence at the time of, for example, turning on the power supply or restarting the system, determines protocols appropriate for communication with the detected disk devices 41, and holds this information as part of the system configuration information in the memory 432. For example, it is possible to determine whether a peripheral device connected to a port is a SAS disk device 41a or a SATA disk device 41b by utilizing an Out Of Band (OOB) signal. An OOB signal is well-known as a primitive pulse signal for handshake use between devices. The system configuration information contains power management parameters relating to power saving control, as described in the following. The port management table includes state parameters provided to each port. Some of the state parameters at the port management table are automatically detected by the control sequence, and some are supplied from the user of the management terminal 5 via the network system 3 or the external I/F 426.

FIG. 5 is a view showing an example of a port management table of the intermediary device 43 of an embodiment of the present invention. The port management table is arranged in the memory 432 by execution of the initialization sequence, for example, at the time of input of the power supply or starting up of the intermediary device 43 under the control of the processor core 431.

As described above, the intermediary device 43 of this embodiment has thirty-two ports 434, with each port 434 being uniquely identified by a port number. Each port 434 contains information relating to connection type, connection device type, interface type, operation mode, mode transition date, mode transition time, I/O amount per minute, transition waiting period, and a transition table. In the same figure, it is shown that, for example, port number "1" has made a transition to be currently "Active" at 6:30 on the fourteenth of XX, 2006, and that 0:00:30 has elapsed from the I/O amount becoming zero. It is then possible to acquire, for example, the operating mode (in power saving mode or in normal mode) of the disk devices 41 connected to port 434 by referring to the intermediary device 43 and the port management table.

Returning back to FIG. 4, the external interface 433 is an interface for connecting the intermediary device 43 to a disk interface 424 of the controller unit 42 (see also FIG. 2). The external interface 433 is connected to the processor core 431.

The port 434 is an interface for connecting the disk devices 41 using a point to point method. A unique port number is allocated to each port 434. In this embodiment, thirty-two ports 434 are provided, and thus port numbers 0 to 31 are allocated to each port 434.

The switching mechanism 435 includes switching elements for selectively and uniquely establishing a data communication path between the external interface 433 and a port 434 and an arbiter for mediating in the event of concurrent path establishment.

The buffer memory 436a is configured from non-volatile memory. The buffer memory 436a is mediated by the arbiter, and temporarily holds path data for another established path that is given. On the other hand, the buffer memory 436b is configured using volatile memory. The buffer memory 436a and/or 436b may also be utilized as cache memory for the intermediary device 43.

Figure 6:
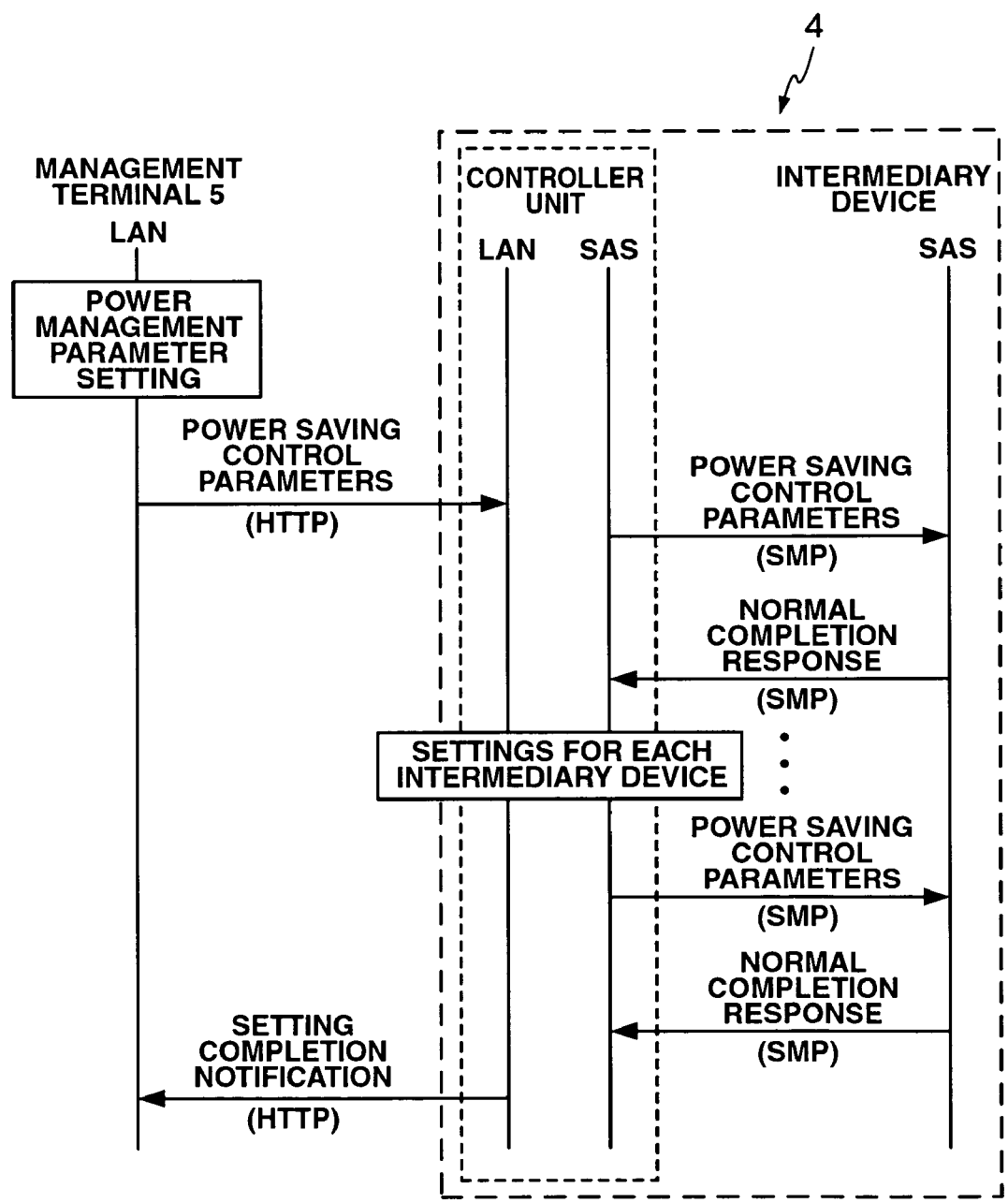
FIG. 6 is a sequence view illustrating setting processing for the intermediary device of an embodiment of the present invention.

FIG. 6 is a sequence view illustrating setting processing for the intermediary device 43 of an embodiment of the present invention. Setting processing for the intermediary device 43 is typically carried out via the controller unit 42 from the utility tools on the management terminal 5. The utility tools are a type of management program and provide a user interface in such a manner that a system administrator can interactively set various parameters.

Figure 7:
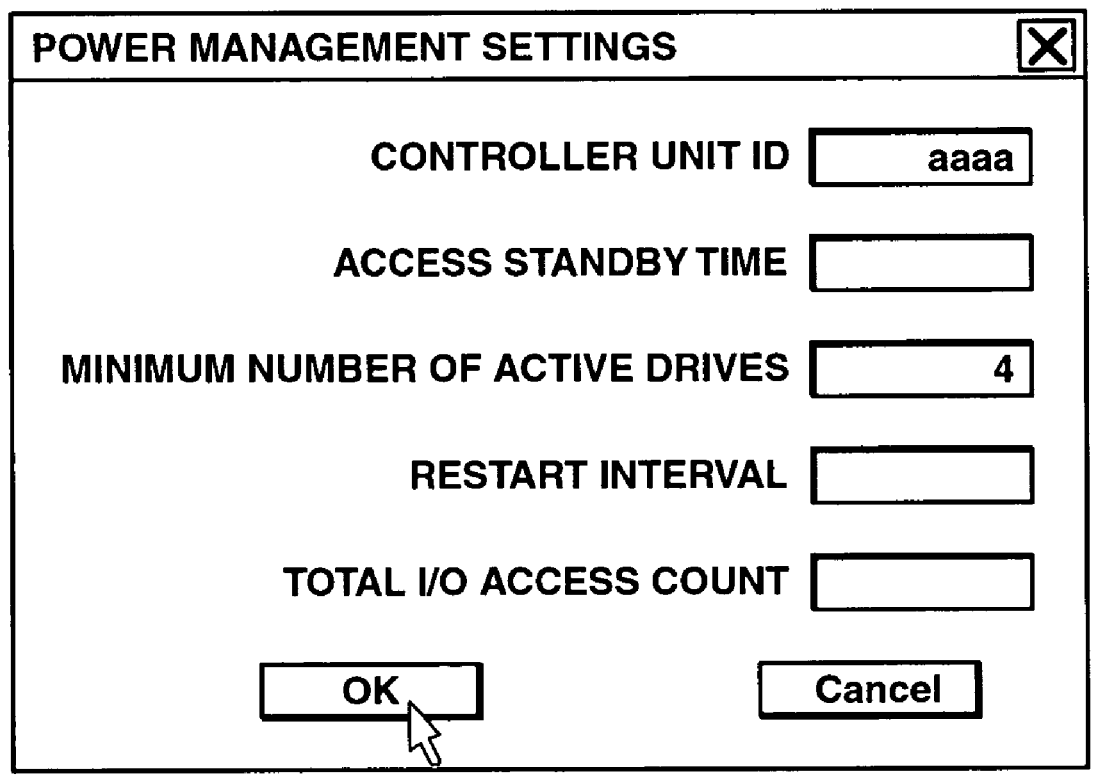
FIG. 7 is a view showing an example of a user interface providing utility tools on a management terminal of an embodiment of the present invention.

FIG. 7 is a view showing an example of a user interface providing utility tools on the management terminal 5 of an embodiment of the present invention. As shown in FIG. 7, a system administrator sets power management parameters for the storage apparatus 4 using a system manager on the management terminal 5. In this embodiment, the power management parameters are comprised of parameters relating to "access standby time," "minimum number of active drives," "restart interval," and "total I/O access count." The "non-access (standby) time" is the standby time that calculated from the elapsed time of the last I/O access. Namely, the time permitted from blocking of an I/O access. The "minimum number of active drives" is the minimum number of activated disk devices 41 connected to and under the control of the intermediary device 4. The number of disk devices 41 in active, during operation of the storage apparatus 4, does not fall below the minimum number of driven items. The "restart interval" is the time interval from the time of a disk device 41 making a transition to power saving mode up to a transition to normal mode regardless of I/O access requests. The "total I/O access count" is a total value for an amount of I/O accesses (I/O traffic count) occurring at valid ports 434 disk devices 41 are connected to excluding I/O access requests transferred to other intermediary devices 43. Further, this may also be a quotient (average I/O access count per port) arrived at by dividing this total value by the total number of valid ports 434. Further, the set value may also be changed dynamically to give some percentage of the "access standby time."

Upon receiving the set parameters, the utility tools transmit the set requests for the parameters in accordance with, for example, HTTP, to the controller unit 42 of the storage apparatus 4 in accordance with a predetermined communication protocol.

Returning to FIG. 6, the controller unit 42 receiving the parameters from the management terminal 5 hands over the parameters to a corresponding intermediary device 43 via the disk interface 424 under the control of the CPU 421. The control unit 42 and each intermediary device 43 then carry out communication in accordance with SMP. When a normal completion message is received from the intermediary device 43, the controller unit 42 takes this as recognition that setting of the intermediary device 43 is complete. The controller unit 42 then carries out communication with each of the intermediary devices 43, and carries out setting of all of the intermediary devices 43 with respect to the received parameters. When setting of all of the intermediary devices 43 is complete, the controller unit 42 sends notification of setting completion to the management terminal 5. When notification of setting completion is received, the utility tools report to the system administrator of this.

FIG. 8 is a view showing an example of system configuration information for the intermediary device 43 of an embodiment of the present invention. When a power management parameter configuration request is received from the management terminal 5 via the controller unit 42, the intermediary device 43 stores this as part of the system configuration information. The power management parameters are, for example, comprised of parameters relating to "access standby time," "minimum number of driven items," "restart interval," and "total I/O access count," as described above. As described in the following, the power management parameters are referred to in the processing sequence for control of operation of the disk devices 41.

Figure 9:
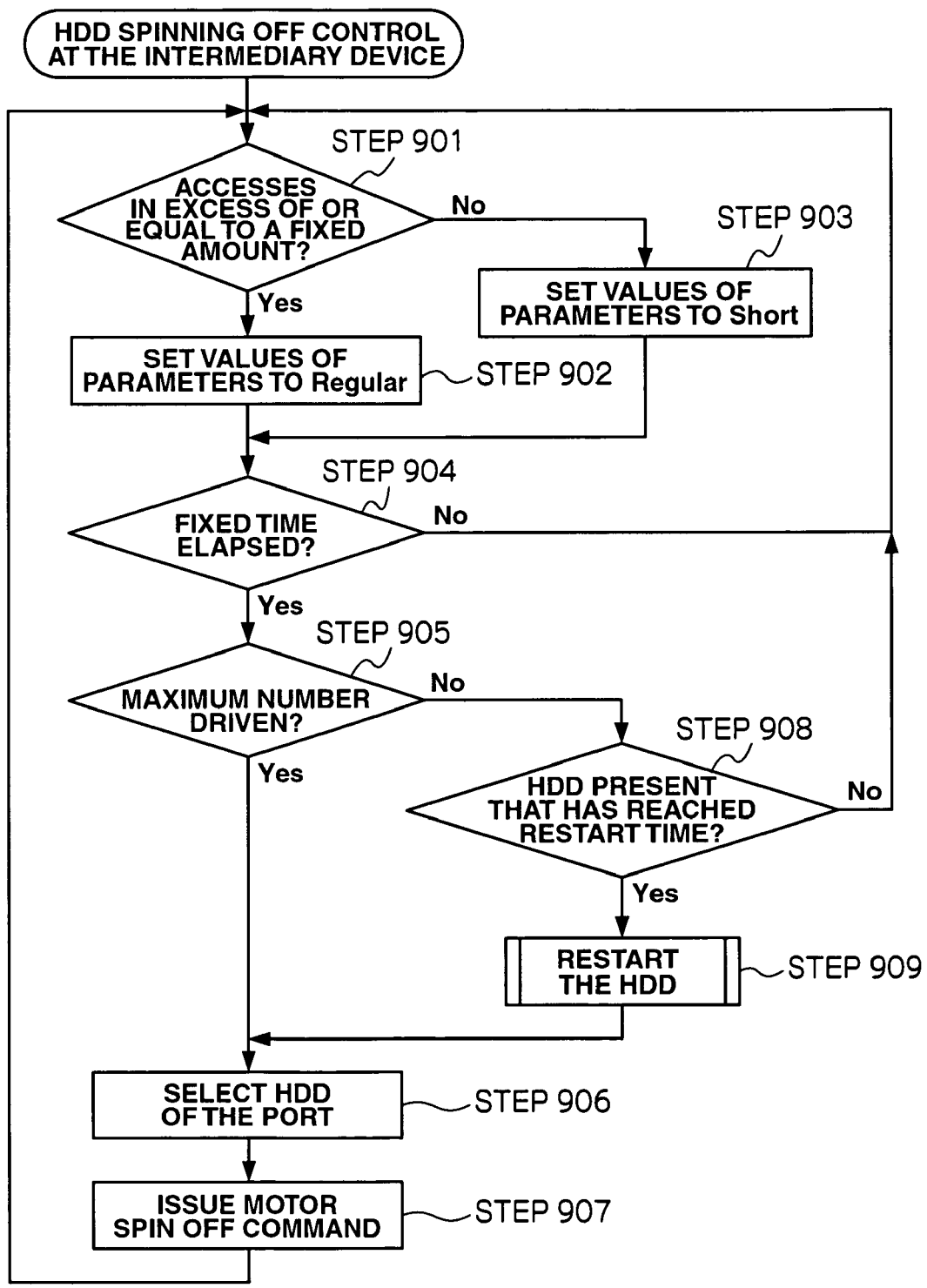
FIG. 9 is a flowchart showing control of a disk device of storage apparatus of an embodiment of the present invention.

FIG. 9 is a flowchart showing control of a disk device 41 of the storage apparatus 4 of an embodiment of the present invention. Specifically, FIG. 9 illustrates stopping control for a disk device 41, by an intermediary device 43, that matches power saving mode transition conditions. The intermediary device 43 may monitor each port 434 in parallel in order to detect a disk device 41 matching with power saving mode transition conditions.

The intermediary device 43 periodically scans each port 434 in order to detect a disk device 41 intended for a transition to power saving mode. The transition to power saving mode is carried out for disk devices 41 that have not been accessed by the controller unit 42 for a predetermined time or more. In this embodiment, the intermediary devices 43 exert control in such a manner that transitions are made to power saving mode for the disk devices 41 so that a number of disk devices 41 equal to or greater than the number specified by the minimum number of driven items in the power management parameters operate in normal mode. Therefore, when a number of disk devices 41 specified by the minimum number of driven items are already being driven, disk devices 41 to be returned to normal mode are selected from disk devices 41 making the transition to power saving mode, and these are switched over. For example, with regards to one of the disk devices 41 that has made the transition to power saving mode and that exceeds the time designated by the restart interval parameter even when a state where there is no access from the controller unit 42 is continued, the intermediary device 43 reverts that disk to normal mode for the purposes of diagnosis. Also, the intermediary device 43 puts a disk devices 41 detected as not having been accessed for a predetermined time or more to power saving mode to swap them.

More specifically, as shown in FIG. 9, the intermediary device 43 determines whether or not there have been I/O accesses of a fixed amount or more for each of the ports 434 (STEP 901). It is then determined whether or not a value divided a total value for the amount of I/O accesses occurring at valid ports 434 connecting disk devices 41 by the total number of the valid ports 434 is greater than or equal to a predetermined value. The valid ports are ports to which disk devices 41 under the command of the intermediary device 43 are connected. When it is determined that there has been accesses to the connected disk devices 41 under the control of the intermediary device 43 in excess of or equal to the fixed amount (STEP 901, "Yes"), a power management parameter is set to a first value (STEP 902), and when it is determined that there has not been accesses in excess of or equal to the fixed amount (STEP 901, "No"), a power management parameter is set to a second value (STEP 903). The first and second values indicate time elapsed since blocking of an access. For example, if the first value is set to "five minutes," the second value is set to a time shorter than this of "three minutes." Setting may also be performed so that parameter sets (matching criteria) occurring at the power management parameters are saved as a plurality of tables, with these then being switched over.

Next, the intermediary device 43 checks whether or not time exceeding or equal to the set time has elapsed from the last access from the controller unit 42 (STEP 904). When it is determined that there has been no access for the fixed time or more (STEP 904, "Yes"), the intermediary device 43 checks whether or not the number of disk devices 41 currently in normal mode is equal to the minimum number of driven items (STEP 905). When the minimum number of driven items is not equal, i.e., when it is possible for additional disk devices 41 to make the transition to power saving mode (STEP 905, "Yes"), the port 434 is selected (STEP 906), and then a motor stopping command (spin off command) is sent to the disk device 41 connected to the port 434 (STEP 907).

As described above, communication between the intermediary device 43 and the disk devices 41 is carried out in accordance with protocols depending on the type of device and commands for devices such as motor stopping commands etc. depend on the type of disk device 41. FIG. 10 shows examples of SAS/SATA command sets issued by the intermediary device 43 of an embodiment of the present invention. Referring to FIG. 10, the intermediary device 43 sends a "Unit Stop" command to the SAS disk device 41a, and sends a "SLEEP" command to the SATA disk device 41b.

On the other hand, when it is determined that the number of disk devices 41 in normal mode has already reached the minimum number of driven items (STEP 905, "No"), the intermediary device 43 determines whether or not disk devices 41 have reached the restart time (STEP 908). When a disk device 41 has reached the restart time (STEP 908, "Yes"), start up processing is carried out in order for the disk device 41 that has reached the restart time to make the transition to normal mode (STEP 909). The details of start up processing for the disk devices 41 will be described later. The number of drives being driven becomes larger than the minimum number of driven items as a result of disk devices 41 being started up. The intermediary device 43 therefore selects the disk device 41 of the port (STEP 906), and causes a transition to power saving mode to be made (STEP 907).

Figure 11:
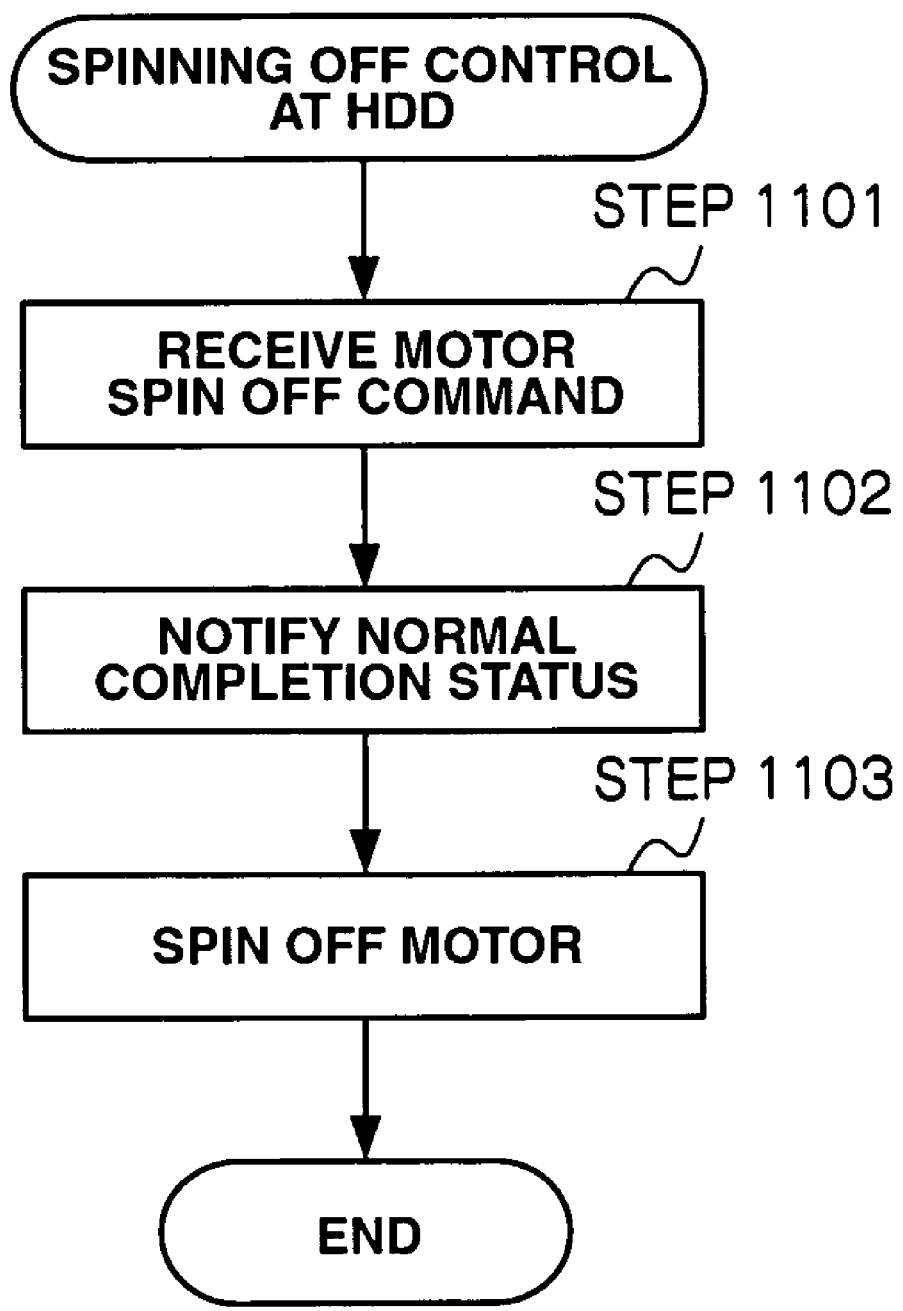
FIG. 11 illustrates motor stopping control of a disk device of storage apparatus of an embodiment of the present invention.

FIG. 11 illustrates motor stopping control by disk devices 41 at storage apparatus 4 of an embodiment of the present invention.

In response to the issuing of a motor stopping command in STEP 904 of FIG. 9 described above, where a spin off command is received from the intermediary device 43 (STEP 1101), the disk device 41 sends a normal completion status to the intermediary device 43 (STEP 1102), and driving of a spindle motor is made to stop in order to switch over from normal mode to power saving mode (STEP 1103). Upon receiving normal completion status from a disk device 41, the intermediary device 43 recognizes that the disk device 41 matching with the power saving mode transition conditions has stopped normally.

Figure 12:
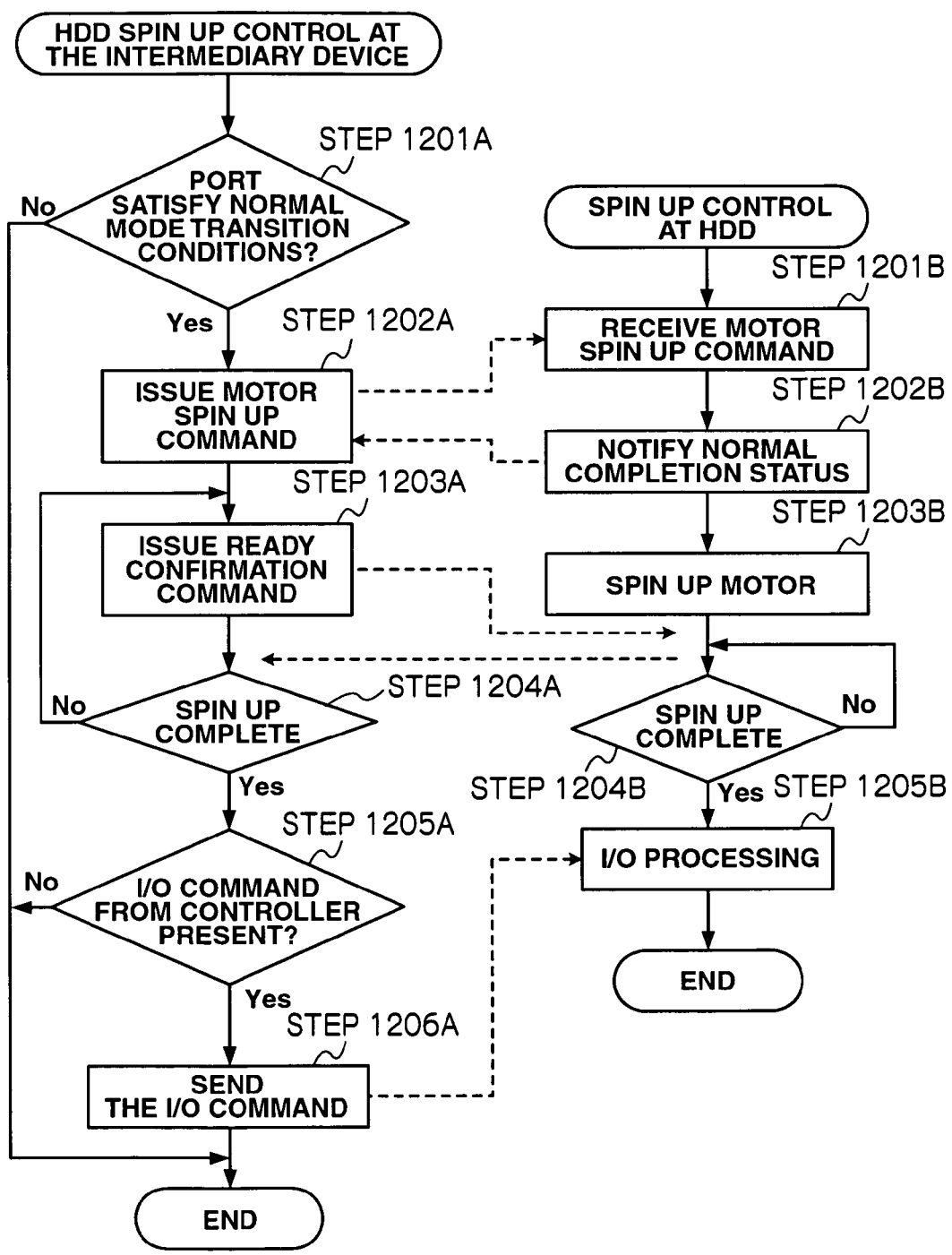
FIG. 12 is a further flowchart showing control of a disk device of storage apparatus of an embodiment of the present invention.

FIG. 12 is a flowchart showing control of disk devices of the storage apparatus of an embodiment of the present invention. Specifically, FIG. 12 describes start up control (control of the transition from power saving mode to normal mode) of the disk devices 41 by the intermediary device 43.

Referring to FIG. 12, the intermediary device 43 monitors whether or not each of the ports 434 matches the normal mode transition conditions (STEP1201A). More specifically, matching is determined in the case that an I/O access request (I/O command) received from the controller unit 42 is an I/O access request for a disk device 41 in power saving mode or is a disk device 41 that has been restarted as described previously in FIG. 9.

When there is a port 434 matching the normal mode transition conditions (STEP1201A, "Yes"), the intermediary device 43 transmits a spin up command to start up the motor to the disk device 41 connected to the port 434 (STEP1202A). Namely, if, as shown in FIG. 10, the intermediary device 43 is a SAS disk device 41, a "Unit Start" command is sent. Further, if the device is a SATA disk device 41, a "DEVICE RESET" command and an "IDLE IMMEDIATE" command are sent.

When a spin up command is received from the intermediary device 43 (STEP1201B), the disk device 41 sends a normal completion status to the intermediary device 43 (STEP1202B). The spindle motor is then started up in order to switch over from power saving mode to normal mode (STEP1203B). As a result, the intermediary device 43 recognizes that the spindle motor of the disk device 41 matching with the power management parameters has started up normally.

Then, the intermediary device 43 sends a ReadyCheck command to the disk device 41 (STEP1203A). This is in order to check whether or not the spindle motor of the disk device 41 has reached a steady speed. When the spindle motor reaches a steady speed and it is detected that start up is complete (STEP1204B), the disk device 41 sends a start up complete report to the intermediary device 43. The intermediary device 43 then issues a Relay Check command until the start up complete report is received (STEP1204A).

When the start-up complete state is detected (STEP1204A, "Yes"), the intermediary device 43 determines whether or not an I/O command is received for the disk device from the controller unit 42 (STEP1205A). When an I/O command is received (STEP1205A, "Yes"), the I/O command is transmitted to the disk device (STEP1206A). Upon receiving the I/O command, the disk device 41 carries out processing based on the I/O command (STEP1205B).

The intermediary device 43 receiving an I/O access request for the disk device 41 from the controller unit 42 may be designed taking into consideration command timeout on the side of the controller unit 42.

When the I/O request is a read request command, in the event that a timeout of a command (session) occurring on the side of the controller unit 42 (including OS/application programs on the host apparatus 2) is set to be sufficiently longer than the required start up time of the disk device 41, the intermediary device 43 holds the read request command in the buffer memory 436a, and sends the read request command at the time of receiving the start up complete report. When the command timeout is short, the intermediary device 43 requires the controller unit 42 to retry, and sends a predetermined message for keep connecting the communication session.

When the I/O access request is a write request command for a disk device 41 in power saving mode, a delay may occur in the write processing because a predetermined time is required until the disk device 41 starts up. A mechanism for protecting the delayed write data in order to reliably hold the write request command and write target data correlated with this in a reliable manner is therefore necessary. For example, (1) data protection employing cache memory of the controller unit 42, (2) data protection employing the non-volatile buffer memory 436a of the intermediary device 43, and (3) data protection utilizing external storage connected to the intermediary device 43 can be considered as this kind of mechanism. Further, (3-1) utilization of part of a disk device 41 connected to the intermediary device 43, and (3-2) utilization of a non-volatile storage device externally fitted to the intermediary device 43 can be considered as data protection using external storage.

Here discussed is a data protection method employing cache memory of the controller unit 42. This protection method is designed in such a manner that the controller unit 42 does not release write target data correlated to the write request command from cache memory until normal completion status for the write request command is received from the disk device 41. In this case, the intermediary device 43 sends a predetermined message for the controller unit 42 for disk devices 41 being driven. Further, it is also possible for the intermediary device 43 to transfer the command from the controller unit 42 to the disk device 41 and for the controller unit 42 to perform a retry with respect the Not Ready status that is to be transmitted from the disk device 41, after the spindle motor is started up and a period of time has elapsed so that disk device 41 is accessible.

Figure 13:
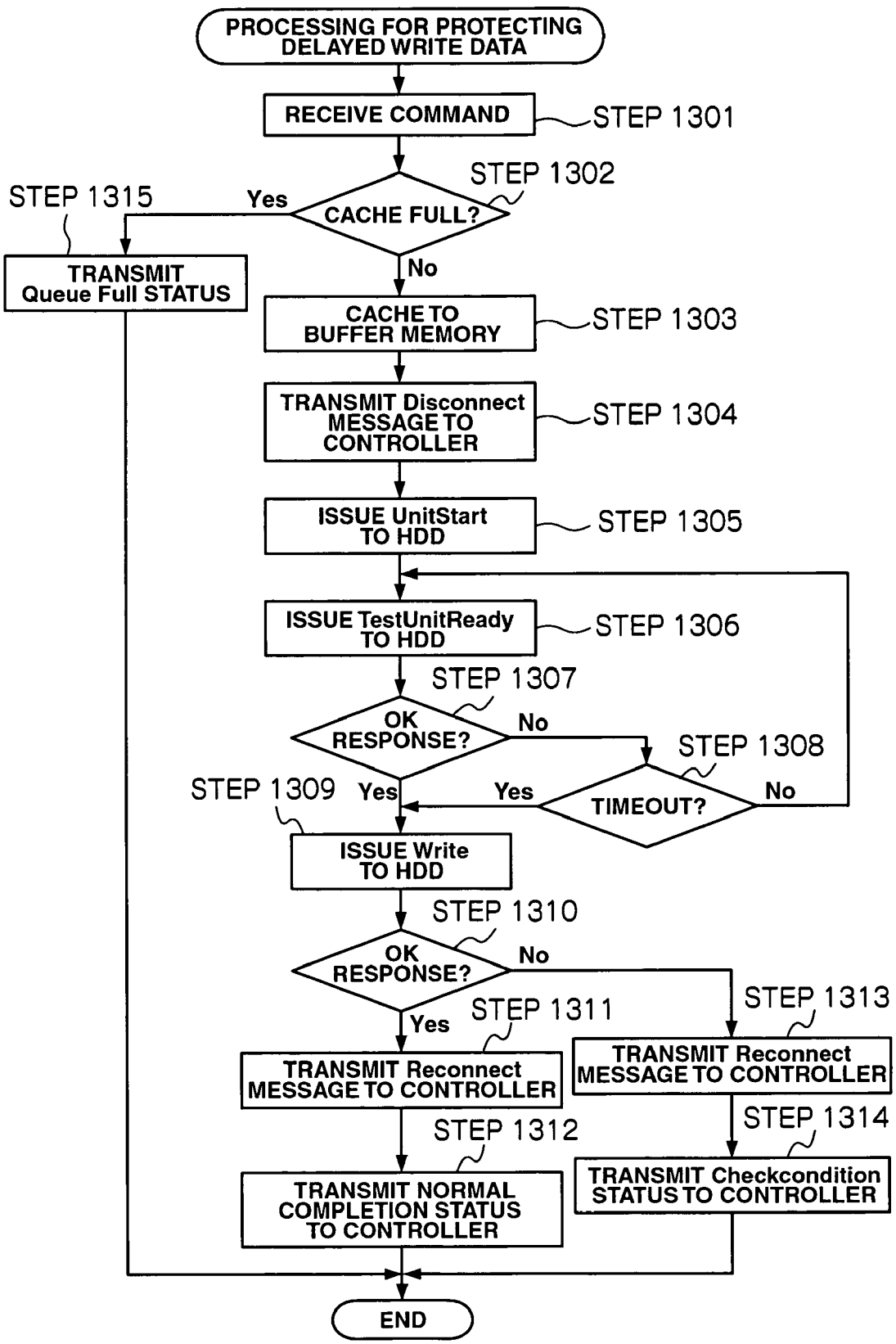
FIG. 13 is a flowchart illustrating the operation of the intermediary device of an embodiment of the present invention.

FIG. 13 is a flowchart illustrating the operation of the intermediary device 43 of an embodiment of the present invention. It is noted that a description is given where the disk device 41 connected to the port 434 constituting the target is a SAS disk device.

First, when a write request command from the host apparatus 2 is sent to the storage apparatus 4, the controller unit 42 temporarily stores write target data correlating to the command to the cache memory as a result of the action of the cache mechanism 423 and sends the command (containing the write target data) to the intermediary device 43 in order to write the write target data to the disk device. 41.

As shown in FIG. 13, when the write request command is received from the controller unit 42 (STEP1301), the intermediary device 43 checks whether or not it is possible to cache this write request command in the buffer memory 436a (STEP1302). When it is determined that caching is possible (STEP1302, "No"), the intermediary device 43 stores the write request command in the buffer memory 436a (STEP1303). When the buffer memory 436a is full so that caching is not possible, the intermediary device 43 sends a Queue Full status to the controller unit 42 (STEP1315).

Next, by sending a Disconnect message to the controller unit 42 (STEP1304), the intermediary device 43 notifies the controller unit 42 that the disk device 41 is starting up, and temporarily holds the command sequence. As a result, the controller 42 is able to extend the timeout time. In addition, the intermediary device 43 sends the motor start up command "Unit Start" command to the disk device 41 (STEP1305) in order to start up the spindle motor of the disk device 41 that is the target of writing. The disk device 41 receiving the motor start up command "Unit Start" then carries out the start up processing described above.

When normal completion status is received from the disk device 41, the intermediary device 43 sends a Ready Check command "Test Unit Ready" to the disk device 41 (STEP1306), and determines whether or not start up is complete (STEP1307). The intermediary device 43 continues transmission of the Ready Check command until the start up complete report is received from the disk device 41 but it is assumed that start up is complete at a point where a fixed time elapses, and the next process is proceeded to (STEP1308, "Yes").

When a start up complete message is received, or when a fixed time elapses, the intermediary device 43 further sends a write request command to the disk device 41 (STEP1309). The disk device 41 receiving this then carries out write processing, and when write processing is completed normally, a write complete status is sent to the intermediary device 43.

When a write complete status is received (STEP1310, "Yes"), the intermediary device 43 sends a Reconnect message to the controller unit 42 (STEP1311). As a result, the intermediary device 43 proceeds with the command sequence held for the controller unit 42. When execution of a series of commands is complete, the intermediary device 43 transmits a normal completion status to the controller unit 42 (STEP1312). Upon receiving the normal completion status, the controller unit 42 releases the area of the cache memory where the write target data is stored.

By way of this, in this embodiment, write target data is temporarily held in the cache memory of the controller unit 42. It is therefore possible to prevent loss of write target data even in failure in writing of data due to unknown states such as for power failure, etc. In this embodiment, among other things, a command sequence is suspended and restarted using Disconnect/Reconnect. It is therefore possible to prevent loss of write target data because the controller unit 42 does not release the cache area with the limit that the command sequence does not end.

On the other hand, when the intermediary device 43 cannot receive the write complete status within a fixed period of time (STEP1310, "No"), the intermediary device 43 first sends a Reconnect message to the controller unit 42 (STEP1313), then sends a check condition status to the controller unit 42, and processing is complete. The check condition status is an error report from the disk device 41. In this case, the controller unit 42 may send the write request command again without the region on the cache memory being released.

In this embodiment, the non-volatile buffer memory 436*a* is used in order to cache the write request command at the intermediary device 43 but it is also possible to use volatile buffer memory 436*b*.

MODIFIED EXAMPLE 1

A mechanism (corresponding to (2) above) for protecting delayed write data using the non-volatile buffer memory 436*a* of the intermediary device 43 is described below in details.

Figure 14:
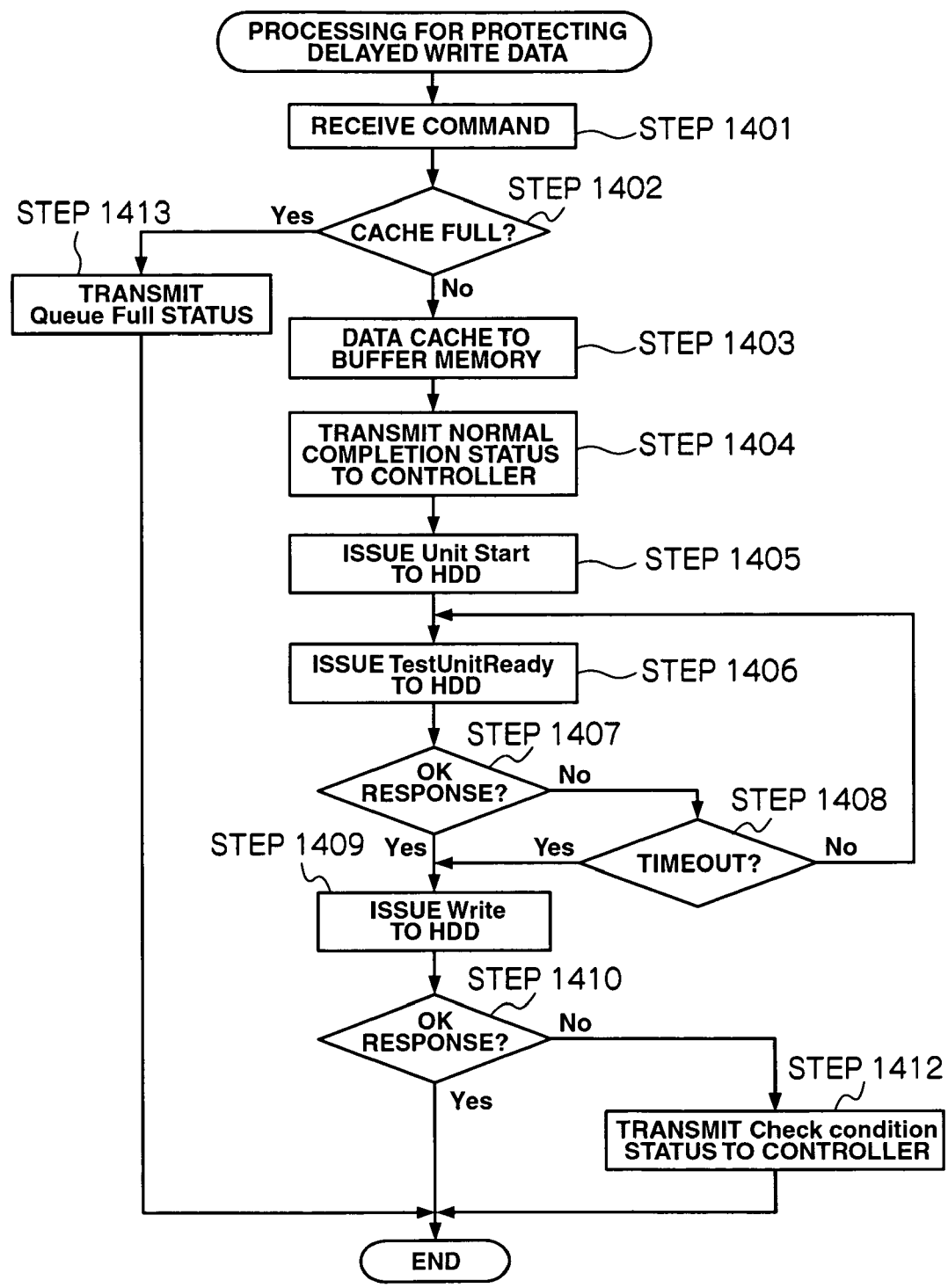
FIG. 14 is another flowchart illustrating the operation of the intermediary device of an embodiment of the present invention.

FIG. 14 is a flowchart illustrating the operation of the intermediary device 43 of an embodiment of the present invention. It is noted that a description is given where the disk device 41 connected to the port 434 constituting the target is a SAS disk device.

As with the embodiment described above, when a write request command from the host apparatus 2 is sent to the storage apparatus 4, the controller unit 42 temporarily stores write target data correlating to the command to the cache memory as a result of the action of the cache mechanism 423, and also sends the command (containing the write target data) to the intermediary device 43 in order to write the write target data to the disk device. 41.

Referring to FIG. 14, when the write request command is received from the controller unit 42 (STEP1401), the intermediary device 43 checks whether or not it is possible to cache this write request command in the buffer memory 436*a* (STEP1402). When it is determined that caching is possible (STEP1402, "No"), the intermediary device 43 stores write target data correlated to the write request command in the buffer memory 436*a* (STEP1403). When the buffer memory 436*a* is full so that caching is not possible, the intermediary device 43 sends a Queue Full status to the controller unit 42 (STEP1413).

Subsequently, the intermediary device 43 sends a normal completion status to the controller unit 42 (STEP1404). In this way, the controller unit 42 releases the area of the cache memory relating to the write target data. Namely, in this modified example, rather than interrupting the command sequence once using the Disconnect message, a normal completion status is returned to the controller unit 42 at the time where the intermediary device 43 caches write target data correlating to the write request command to the buffer memory 436*a* and releases the cache memory region on the controller unit 42. Because of this, it is preferable for the intermediary device 43 to cache the write request command in the buffer memory 436*a* from the viewpoint of preventing data loss.

The intermediary device 43 sends the motor start up command "Unit Start" to the disk device 41 (STEP1405) in order to start up the spindle motor of the disk device 41 that is the target of writing. The disk device 41 receiving the motor start up command "Unit Start" the carries out the start up processing described above.

In response to the normal completion status sent from the disk device 41, the intermediary device 43 sends a Ready Check command "Test Unit Ready" to the disk device 41 (STEP1406), and determines whether or not start up is complete (STEP1407). The intermediary device 43 continues transmission of the Ready Check command until the start up complete report is received from the disk device 41 but it is assumed that start up is complete at a point where a fixed time elapses, and thus the next process is proceeded to (STEP1408, "Yes").

When a start up complete report is received, or when a fixed time elapses, the intermediary device 43 further sends a write request command to the disk device 41 (STEP1409). The disk device 41 receiving this then carries out write processing, and when write processing is completed normally, a write complete status is sent to the intermediary device 43.

When the intermediary device 43 receives a write complete status (STEP1410, "Yes"), this means that the series of processes for the write request command has ended normally. In contrast, when a write complete status is not received within a fixed period of time (STEP1410, "No"), the intermediary device 43, at the next time a command for the disk device 41 is sent, sends a check condition status to the controller unit 42, and ends processing.

MODIFIED EXAMPLE 2

The following is a mechanism (corresponding to (3) described above) for protecting delayed write data using external storage connected to the intermediary device 43. Memory of a comparatively large capacity is required in order to protect delayed write data. Thus, the modified example as discussed below is configured in such a manner as to cache in external storage connected to the intermediary device 43. It is noted that an external storage may be, for example, a specific area formed on a disk device 41 operatively connected to the intermediary device 43, or may be a storage device capable of being externally fitted to the intermediary device 43. The storage device capable of being externally fitted may be, for example, a storage device provided as an independent unit connected using a cable, etc., or a card type memory device installed using a slot. A non-volatile memory is preferable in the event that the storage medium is a memory.

Figure 15:
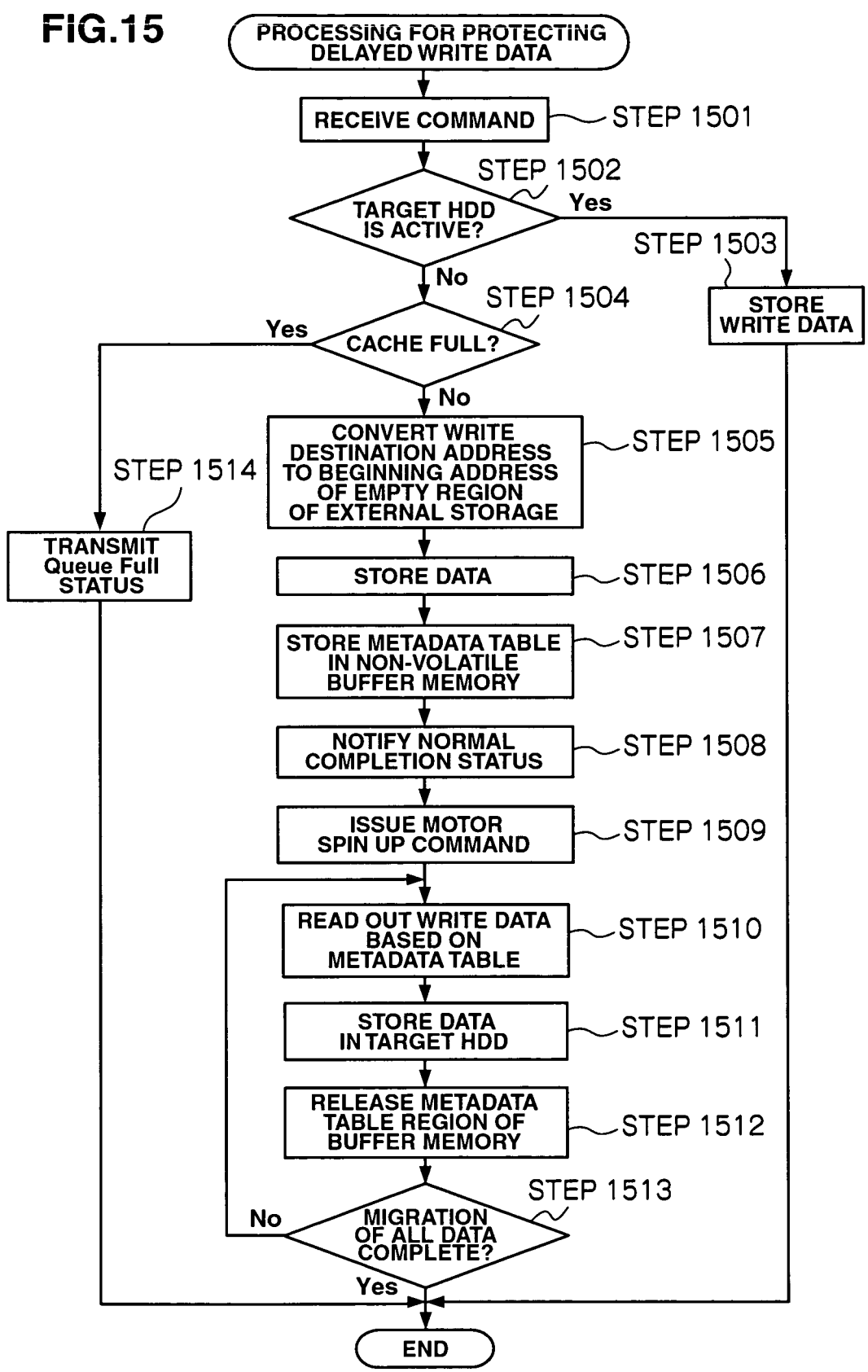
FIG. 15 is a further flowchart illustrating the operation of the intermediary device of an embodiment of the present invention.

FIG. 15 is a flowchart illustrating the operation of the intermediary device 43 of an embodiment of the present invention. This corresponds to (3-1) above. With this flowchart also, a description is given where the disk device 41 connected to the port 434 constituting the target is a SAS disk device.

As described above, (3-1) a method of utilizing a storage area of part of a disk device 41 operating in normal mode of the disk devices 41 connected to the intermediary device 43 as an external storage, and (3-2) a method of utilizing a non-volatile storage device fitted externally to the intermediary device 43 may be adopted as mechanisms for protecting delayed write data. In the former case, the entity of delayed write data is stored temporarily in external storage, and metadata for the data is temporarily stored in non-volatile buffer memory 436a provided at the intermediary device 43. In the latter case, the data entity is stored in an external storage device but part or all of the metadata may be stored in an externally attached storage device.

In this modified example, the data entity is temporarily stored in the external storage connected to the intermediary device 43, whereas the metadata is stored in non-volatile buffer memory 436a provided at the intermediary device 43.

As with the modified example described previously, when a write request command from the host apparatus 2 is sent to the storage apparatus 4, the controller unit 42 temporarily stores the command in the cache memory as a result of the action of the cache mechanism 423, and sends an internal command corresponding to the command to the intermediary device 43 in order to write target data for the command to the disk device 41. As specific distinction is not required in the specification, commands are referred to collectively simply as "command" for convenience.

Referring to FIG. 15, when the write request command is received from the controller unit 42 (STEP1501), the intermediary device 43 receiving this command interprets the command, and checks as to whether or not the disk device 41 that is the target is in normal mode (STEP1502). When it is determined that the disk device 41 that is the target is in normal mode (STEP1502, "Yes"), the intermediary device 43 transfers the command to the disk device 41 (STEP1503). The disk device 41 receiving this then carries out write processing, and when write processing is completed normally, a normal completion status is sent to the intermediary device 43.

On the other hand, When it is determined that the disk device 41 that is the target is not in normal mode (STEP1502, "No"), the intermediary device 43 checks whether or not there is sufficient space for writing at the external storage (STEP1504). The check is carried out by comparing the write target data length at the write request command and the capacity of free space (area) in the external storage. The profile relating to the external storage is, for example, stored in the memory 432 as part of the system configuration information described above.

Figure 16:
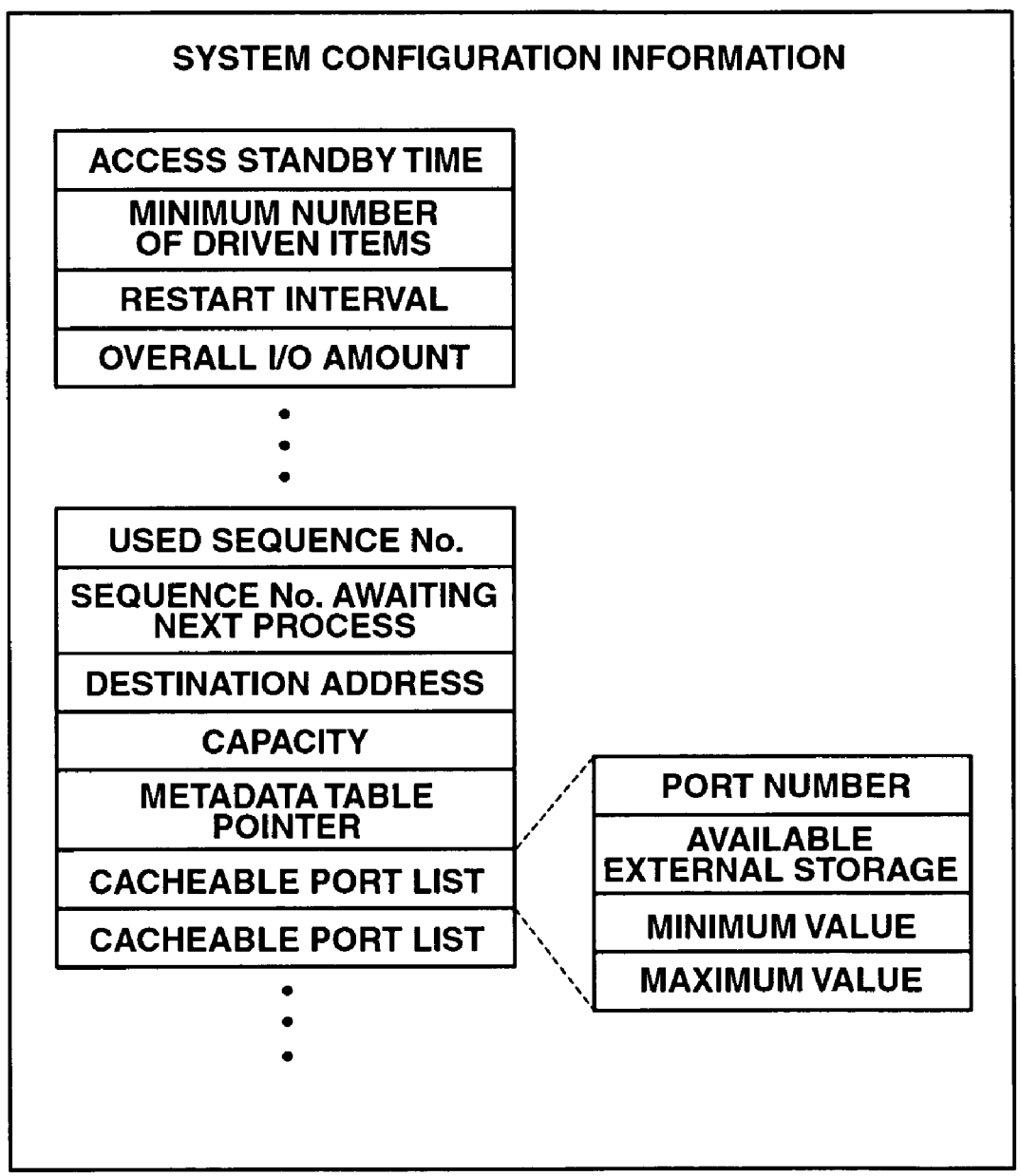
FIG. 16 is another view showing an example of system configuration information stored in memory of the intermediary device of an embodiment of the present invention.

FIG. 16 shows an example of system configuration information stored in memory 432 of the intermediary device 43 of an embodiment of the present invention. The system configuration information contains a pointer for a metadata table described later. Further, system configuration information includes a port list indicating which disk devices 41 connected to the ports 434 are in normal mode. The port list includes for example, the port number of the port 434, the current space defined as the external storage, a minimum value, and a maximum value. The minimum value of the external storage corresponds to the smallest unit for a logical block. A beginning address and allocated capacity are designated at the area taken as the external storage. By way of this, the controller unit 42 is capable of exclusively recognizing the beginning address of the region at the external storage every intermediary device 43.

When it is determined that the results of the comparison are that there is no space (STEP1504, "Yes"), the intermediary device 43 sends a Queue Full status to the controller unit 42 (STEP1514), and processing is complete.

In contrast to this, when there is space (STEP1504, "No"), the intermediary device 43 sends the write target data to the external storage (STEP1506) after converting the write destination address indicated by the write request command to the beginning address of the free space of the external storage (STEP1505). In response to this, when for example, part of the disk device 41 is utilized as the external storage, the disk device 41 carries out write processing, and thereafter when writing is completed normally, normal completion status is sent to the intermediary device 43. Further, the intermediary device 43 stores metadata relating to the write target data in the buffer memory 436a (STEP1507). FIG. 17 shows an example of a metadata table stored in the intermediary device 43 of an embodiment of the present invention. As shown in FIG. 17, the metadata is uniquely identified and managed using each sequence number. The sequence number is a number allocated each I/O access request. A Logical Block Address (LBA) indicates a beginning address of that allocated as external storage at the disk device 41.

Returning to FIG. 15, the intermediary device 43 sends a normal completion status to the controller unit 42 (STEP1508). Upon receiving this, the controller unit 42 releases the area of the cache memory storing the write request command. Further, the intermediary device 43 transmits a motor spin up command to the disk device 41, and waits for notification of normal completion status from the disk device 41 (STEP1509).

When the notification of normal completion status is received from the disk device 41, the intermediary device 43 reads out data corresponding to the write request command stored in the buffer memory 436a, and reads out write target data saved to the external storage based on the read out metadata (STEP1510). When part of the disk device 41 is utilized as the external storage, a normal read request command is used. The disk device 41 responding to the read request command reads out the write target data for transmission to the intermediary device 43 together with the completion status.

The intermediary device 43 then stores write target data read from the external storage in the disk device 41 that is the original write target (STEP1511). The disk device 41 that responded to the write request command writes the write target data to a predetermined region and then notifies the intermediary device 43 of normal completion status. Upon receiving the normal completion status, the intermediary device 43 releases the area of the buffer memory 436a the metadata is stored in (STEP1512). The intermediary device 43 then determines whether or not migration of all of the write target data saved in the external storage is complete (STEP1513), and if data for which migration is not complete exists (STEP1513, "No"), STEP1510 is returned to.

THIRD MODIFIED EXAMPLE

Figure 18:
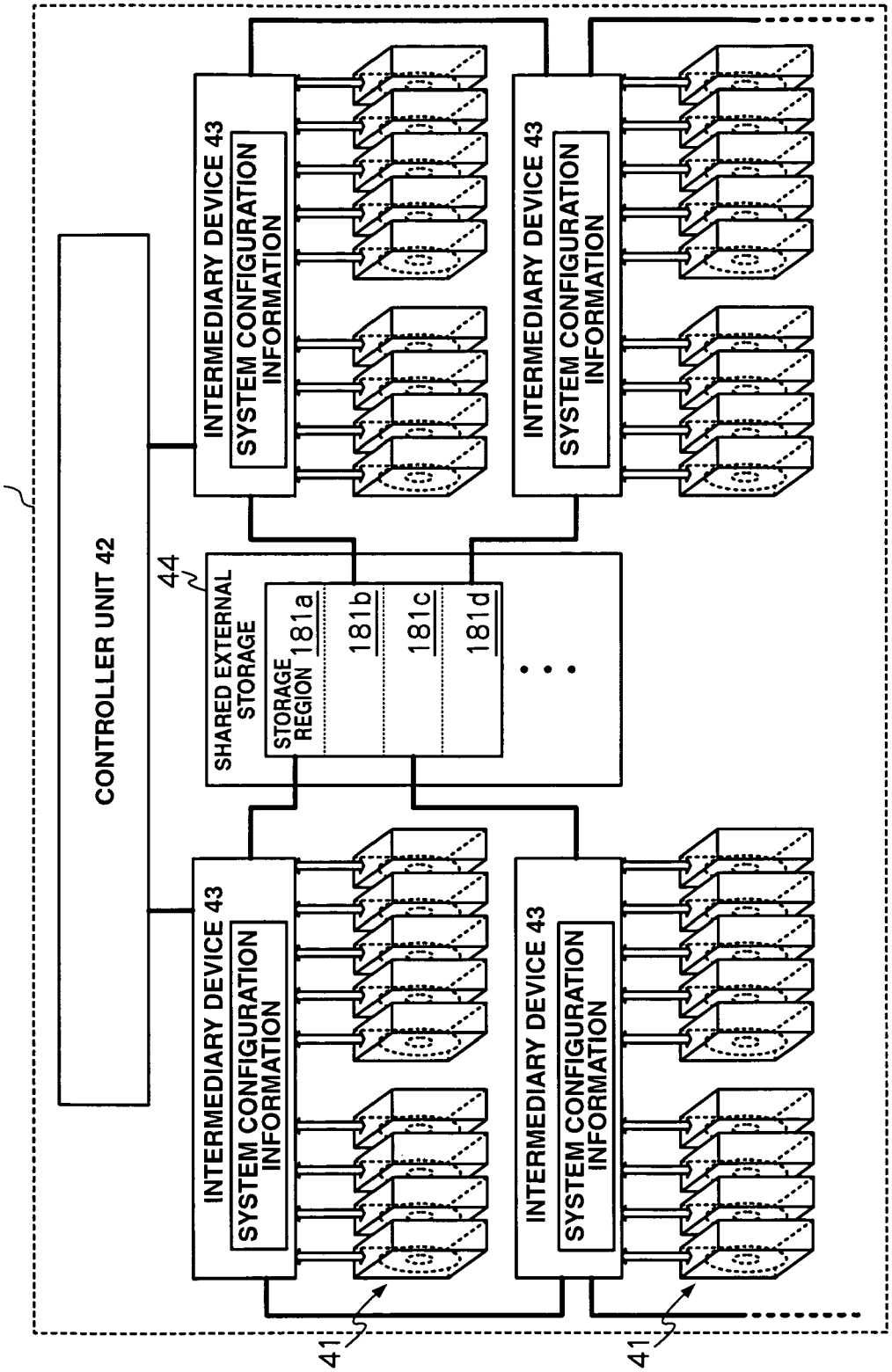
FIG. 18 is a view showing a configuration for storage apparatus of an embodiment of the present invention.

FIG. 18 is a view showing a configuration for storage apparatus of an embodiment of the present invention. Specifically, storage apparatus including an externally attached non-volatile storage device is shown as a mechanism for protecting write delayed data. It is understood that this corresponds to (3-2) above.

As shown in FIG. 18, two intermediary devices 43 are operatively connected to the controller unit 42, and additional intermediary devices 43 are each connected via the other two intermediary devices 43. SAS disk device group 41a and SATA disk device group 41b are operatively connected to ports (not shown) of each intermediary device 43 so that hierarchical utilization of the disk devices 41 is possible. As described above, the intermediary device 43 includes the memory 432, and holds profiles such as system configuration information, etc. Further, the intermediary device 43 holds metadata as shown, for example, in FIG. 19, in the non-volatile buffer memory 436a.

The storage apparatus 4 is provided with common external storage 44 and each intermediary device 43 is connected to the external storage 44. The common external storage 44 includes a non-volatile memory and is configures so as to be capable of read and write processing according to access requests from the intermediary device 43. The common external storage 44 is, for example, installed at a slot provided at casing of the storage apparatus 4 and is connected to each intermediary device 43 using a dedicated cable. Storage areas 181a, 181b, 181c, ... allocated to each intermediary device 43 are set for the common external storage 44.

At the storage apparatus 4 having the configuration described above, each intermediary device 43 carries out power saving control for the disk devices 41 using the common external storage 44. Namely, as described above, when a write request command is sent to a disk device 41 in power saving mode, the intermediary device 43 achieves protection in such a manner that write target data subjected to delays is not lost by saving the write target data once in the external storage 44 until the disk device 41 makes the transition from power saving mode to normal mode.

As a result, it is possible for the degree of freedom of system design to be made high without the intermediary device 43 being required to have internal large capacity non-volatile memory. It is therefore possible to arbitrarily change allocation of storage capacity according to the proportion of the number of devices configuring a RAID group. Further, it is possible for the allocation of storage capacity to be arbitrarily changed even in cases where primary and secondary volumes are formed at the disk devices 41.

In a configuration where primary and secondary volumes are formed and synchronization processing is carried out periodically in accordance with a timer provided at the intermediary device 43, the intermediary device 43 puts a disk device 41 of a secondary volume into normal mode in accordance with the synchronization processing, and may put the disk device 41 into power saving mode after a fixed period of time elapses. It is therefore possible to greatly expand designs according to the RAID configuration because this kind of power saving control setting is carried out at each port 434 of the intermediary device 43.

Second Embodiment

A second embodiment of the present invention is described below in details. This embodiment allows a system circuit within the intermediary device 43 to be downsized, and also allows power saving control to be still more efficient. In viewing this, a power management ordered set and primitive are newly introduced to the storage apparatus 4 of this embodiment. The titles of ordered set and primitive etc. are used depending on storage technology specifications but here "ordered set" is used in the broader sense so as to be inclusive of both of these.

FIG. 20 shows an example of an ordered set of the storage apparatus 4 of an embodiment of the present invention. The corresponding relationship between SAT/SATA commands can be understood by comparing the SAS/SATA commands shown in FIG. 10 described above.

An 8b/10b encoding method typically adopted in serial data transfer technology is adopted in this embodiment. The 8b/10b encoding method is capable of transmitting data other than the original data by converting eight bit data to ten bit data.

The eight-bit data is defined as a code group (notation starting with the character "D") composed of a combination of a lower five bits and upper three bits. Data encoded from eight bits by the encoding method is accordingly constituted by ten bits of data, and further an ordered set is then defined by a combination where for ten bit units of data are brought together to form a forty-bit string. As shown in FIG. 21a and FIG. 21b, the ordered set is a ten bit special code group beginning with the letter "K." In this embodiment, the ordered set for the SAS disk drive 41a is, for example, defined based on "K28.5", and the ordered set for the SATA disk device 41b is, for example, defined based on "K28.3".

The data format for the power management ordered set is defined for such ordered set system.

Figure 22:
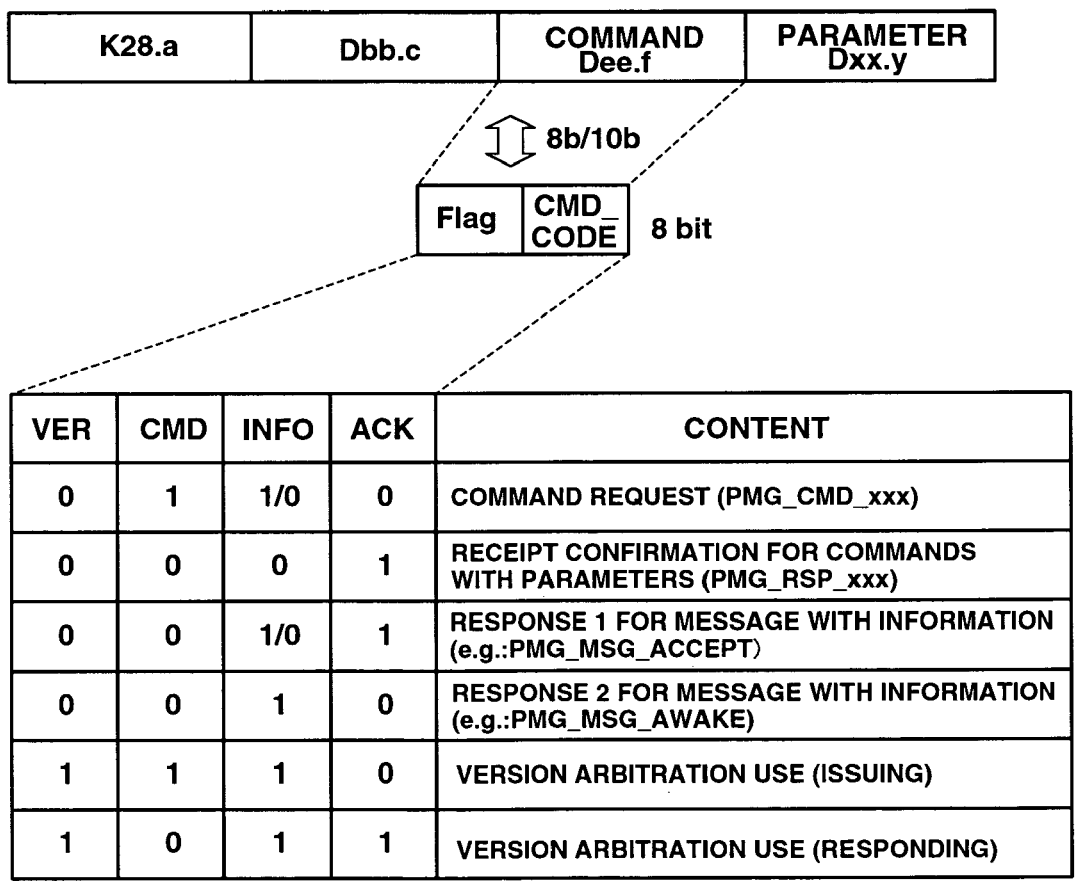
FIG. 22 is a view showing an example of a data format for a power management ordered set of an embodiment of the present invention.

FIG. 22 shows an example of a data format for a power management ordered set of the storage apparatus 4 of an embodiment of the present invention. Individual power management ordered sets include predetermined code groups (in this example, Dbb.c) corresponding to the special code groups followed by the specially encoded groups. The third data unit specifies specific commands. As shown in FIG. 23, specific commands are specified by combinations of four bits of flag field and four bits of command code field. In FIG. 23, this is expressed as eight bits but in the ordered set this becomes a string encoded as ten bits. One or more parameters are necessary depending on the command and the parameters are designated by the fourth data unit.

By way of the above, signals conforming to the defined power management ordered set are transmitted and received between the intermediary device 43 and the disk device 41. It is noted that the power management ordered set corresponds to primitive pulse communication of a lower order level compared to the SAS/SATA command described above.

Figure 24:
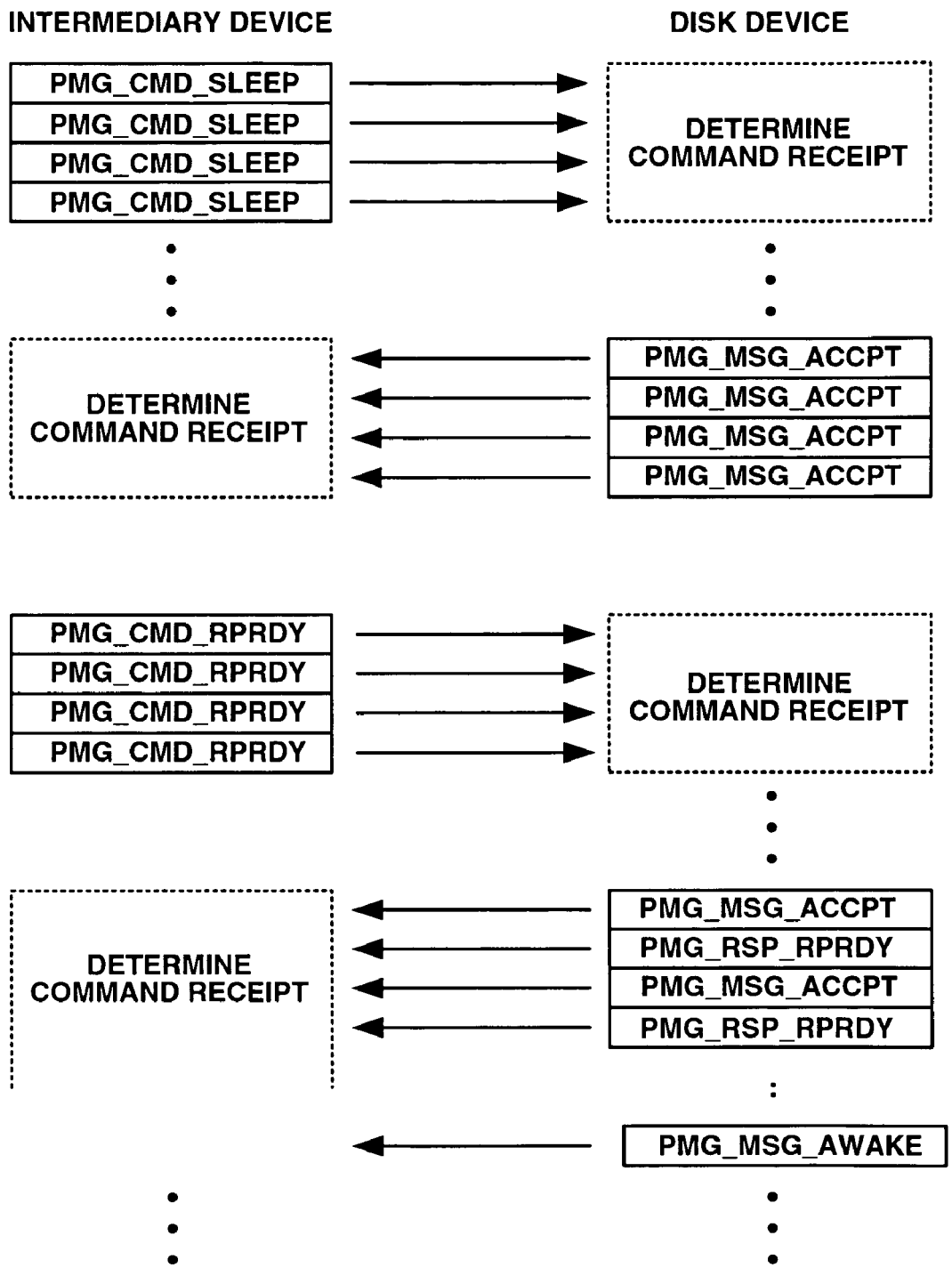
FIG. 24 is a sequence view showing an example of transmitting and receiving power management ordered sets of storage apparatus of an embodiment of the present invention.

FIG. 24 shows an example of transmitting and receiving power management ordered sets of the storage apparatus 4 of an embodiment of the present invention. Referring to FIG. 24, with transmission and receiving of signals between the intermediary device 43 and the disk devices 41, the transmission side repeatedly sends a power management ordered set a predetermined number of times (for example, four times). On the receiving side, acceptance of a command is deemed based on the receipt of the same ordered set a predetermined number of times (for example, two times) or more so as to prevent erroneous operation.

For example, the intermediary device 43 continues to transmit a motor stopping command "PMG_CMD_SLEEP" four times to one of the disk devices 41. Upon receiving the transmitted command two times or more, this disk device 41 takes this command as the signal being received correctly and returns a command receipt response message "PMG_MSG_ACCPT".

Further, when the intermediary device 43 sends a spin up notification request command "PMG_CMD_RPRDY", the disk device 41 returns a message or command in response to this. In this example, a response is made using a spin up response "PMG_RSP_RPRDY". This response contains a Spin Up determination value for SMART (Self-Monitoring, Analysis and Reporting Technology System) information of the disk device 41. SMART is a self-diagnosis function of which the hard disk device is in possession, with each type of inspection item being diagnosed in real time, with this state then being put into digital form. The intermediary device 43 can then recognize the time required by the disk device 41 to respond based on the determination value and can therefore effectively set a timeout time.

Figure 25:
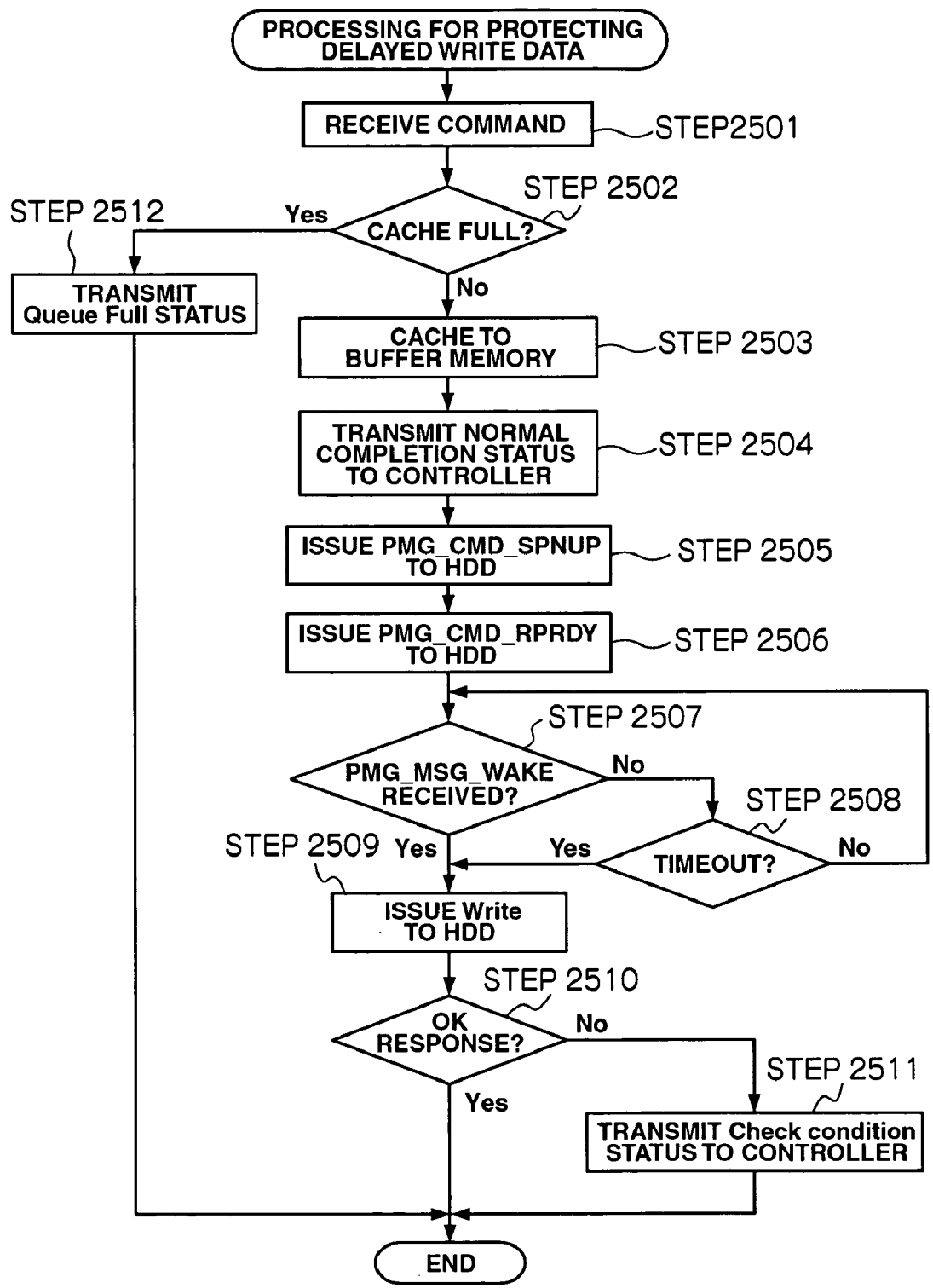
FIG. 25 is another flowchart illustrating the operation of the intermediary device of an embodiment of the present invention.

FIG. 25 is a flowchart illustrating the operation of the intermediary device 43 of an embodiment of the present invention. In FIG. 25, processing is described where a write request command is sent from the controller unit 42 to the disk device 41 in power saving mode of a sleep state using motor spin off command "PMG_CMD_STDBY" that is one request for a transition to power saving mode. As a result of this, the intermediary device 43 then makes the disk device 41 make a transition to normal mode. This corresponds to FIG. 14 described above. The motor spin off command "PMG_CMD_STDBY" makes an interface line of the disk device 41 remain active.

When a write request command from the host apparatus 2 is sent to the storage apparatus 4, the controller unit 42 temporarily stores the command in cache memory as a result of the action of the cache mechanism 423 and sends the command to the intermediary device 43 in order to write a write target data for the command to the disk device 41.

Upon receiving this, as shown in the same figure, when the write request command is received from the controller unit 42 (STEP2501), the intermediary device 43 checks whether or not it is possible to cache this write request command in the buffer memory 436a (STEP2502). When it is determined that caching is possible (STEP2502, "No"), the intermediary device 43 stores the write request command and write data in the buffer memory 436a (STEP2503). If the buffer memory 436a is full so that caching is not possible, the intermediary device 43 sends a Queue Full status to the controller unit 42 (STEP2512).

The intermediary device 43 then sends a normal completion status to the controller unit 42 (STEP2504). Thus, the controller unit 42 releases the area of the cache memory relating to the write request command.

The intermediary device 43 subsequently sends the motor spin up command "PMG_CMD_SPNUP" to the disk device 41 (STEP2505) in order to spin up the spindle motor of the disk device 41 that is the target of writing. The disk device 41 receiving the command then sends a command receipt response message "PMG_MSG_ACCPT" and carries out predetermined spin up processing.

When the command receipt response message is received from the disk device 41, the intermediary device 43 sends a spin up notification request command "PMG_CMD_RPRDY" to the disk device 41 (STEP2506), and determines whether or not spin up is complete (STEP2507). After responding to the spin up notification request command and sending a command receipt response message "PMG_MSG_ACCPT", the disk device 41 sends a spin up notification response message "PMG_MSG_AWAKE." When the start up notification response message is received from the disk device 41 (STEP 2507, "Yes"), or at a time where a fixed period of time has elapsed, the intermediary device 43 proceeds to the next process (STEP2508, "Yes"). Further, the intermediary device 43 may also detect a READY state of the disk device 41 by monitoring a Ready LED pin of an interface connector.

When the spin up complete message is received or when a fixed time elapses, the intermediary device 43 sends a write request command to the disk device 41 (STEP2509). This write request command is a command depending on disk device 41 that may be a SAS or a SATA disk device. The disk device 41 receiving this command then carries out write processing. When write processing is completed normally, a write complete status is sent to the intermediary device 43.

When the intermediary device 43 receives a write complete status (STEP2510, "Yes"), this means that the series of processes for the write request command has ended normally. In contrast, when a write complete status is not received within a fixed period of time (STEP2510, "No"), upon the transmission of the next command, the intermediary device 43 sends a message indicating the check condition status from the disk device 41 (STEP2511), and processing is complete.

The example described above is processing for making a transition from a power saving mode of a standby state to normal mode and the interface line remains active. When processing for a transition from power saving mode of a sleep state to normal mode, an OOB signal (COMINIT) is utilized because the interface line is inactive. This OOB is originally used in establishing links. In this embodiment, this is used so that the motor spin up at the time of receiving the OOB. As a result, it is possible to make the time required to spin up the motor shorter. Specifically, an OOB signal (COMINIT) may be sent in place of the motor spin up command "PMG_CMD_SPNUP" in STEP2505. In this case, this is received by the disk device 41, processing to establish a link using OOB is carried out, and spin up processing is carried out.

According to this embodiment, the intermediary device 43 can be made with little or no addition/modification of software modules without requiring a mechanism for analyzing commands of a SAS/SATA protocol layer positioned at a layer of a higher order protocol stack and the scale of the system circuit can be made smaller. Further, power saving control is possible at a data link layer level even for SAS protocols.

Moreover, the data formats for the SAS protocol and the SATA protocol are different (i.e. SAS adopts a big endian system and SATA adopts a little endian system) which originally made sharing of both platforms difficult. However, by adopting the data format as discussed above, it is possible to achieve platform commonality.

Next, a description is given of a storage system environment where disk devices 41 (power management ordered set power saving control method) compatible with the power management ordered sets described above and disk devices 41 (for example, SAS/SATA command power saving control methods) that are not compatible with this are shared. Such a mixed type storage system environment is implemented by providing intermediary devices 43 compatible with both methods.

Specifically, the intermediary device 43 determines whether or not there is compatibility with a primitive power saving control method using power management ordered sets, and selects SAS/SATA command power saving control methods when it is determined that there is no compatibility with this method.

Figure 26B:
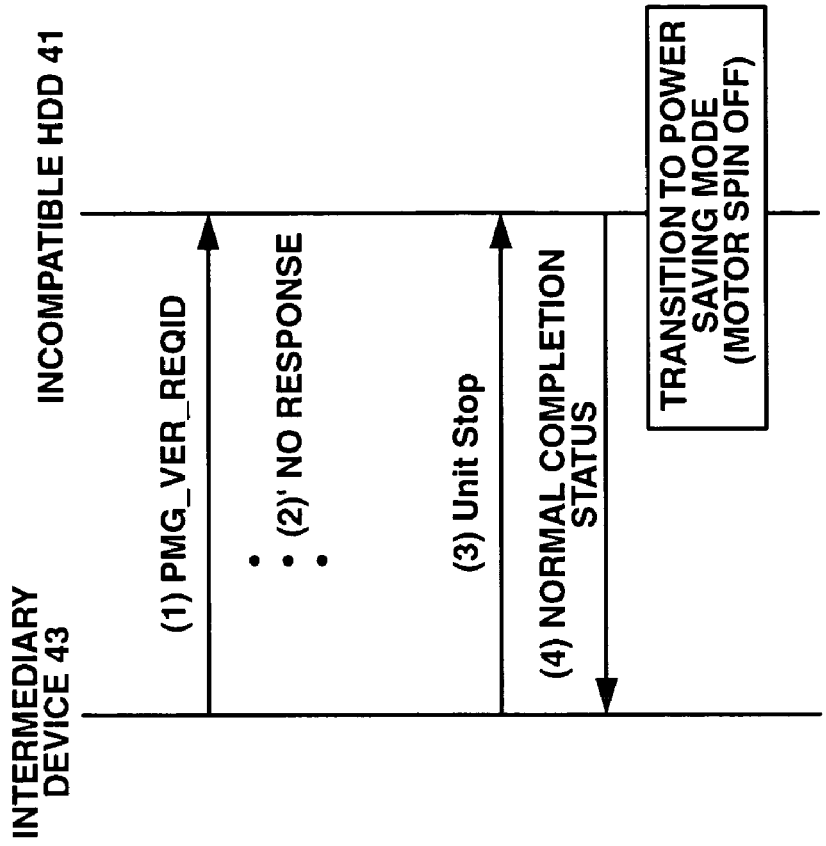
FIGS. 26A and 26B are views each illustrating an example of identification processing of a power saving method of storage apparatus of an embodiment of the present invention.
Figure 26A:
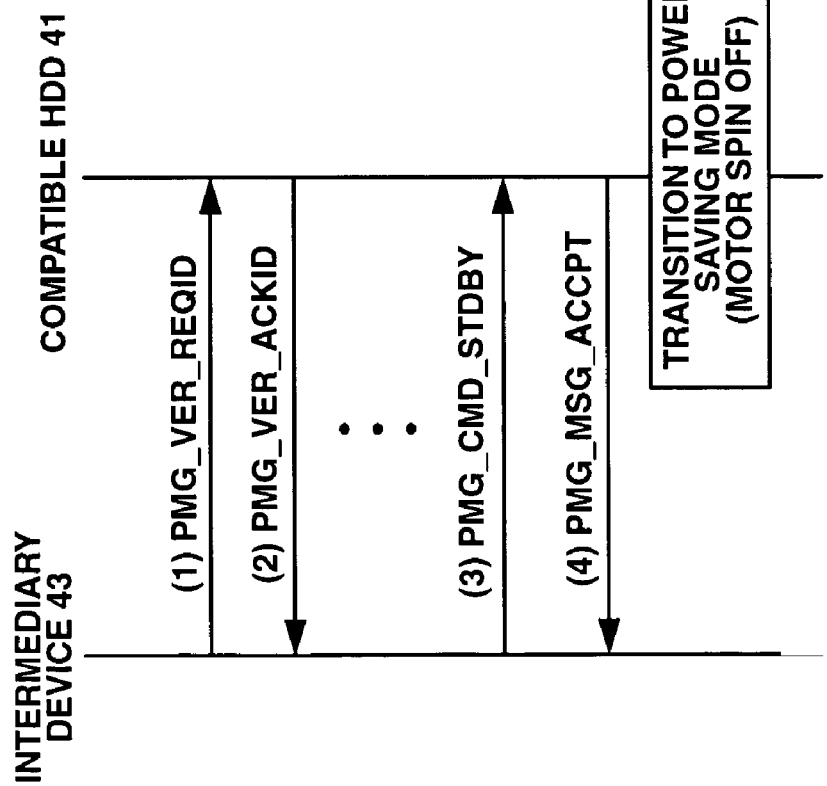

FIG. 26(a) and FIG. 26(b) illustrate an example of power saving method to identify processing of the storage apparatus 4 of an embodiment of the present invention. Specifically, FIG. 26(a) is power saving control for a SAS disk device 41a compatible with power management ordered sets, and FIG. 26(b) is power saving control for SAS disk device 41a that is not compatible with power management ordered sets.

Referring to FIGS. 26(a) and (b), the intermediary device 43 first sends a version mediation command for issuing use "PMG_VER_REQID" to the disk device 41 and awaits the arrival of a response message until a predetermined time elapses ((1) of FIGS. 26(a) and (b)). When a response version mediation message "PMG_VER_ACKID" within a predetermined time ((2) of FIG. 26 (a)), the intermediary device 43 deems the disk device 41 on the opposing side compatible with a power management ordered set power saving control method and, for example, sends a motor spin off command ((3) of FIG. 26(a)). In response to this, the disk device 41 sends a command receipt response message "PMG_MSG_ACCPT" ((4) of FIG. 26(a)), and thereafter makes a transition to power saving mode.

The disk device 41 that is not compatible with power management ordered sets is not capable of understanding power management ordered sets, and the command is therefore discarded or ignored, with no response being sent. Therefore, when there is no response within the predetermined time ((2) of FIG. 26(b)), a motor spin off command "Unit STOP" is sent in place of the power management ordered set ((3) of FIG. 26(b)). In response to this, the disk device 41 sends a normal completion status ((4) of FIG. 26(b)), and thereafter makes a transition to power saving mode.

Figure 27A:
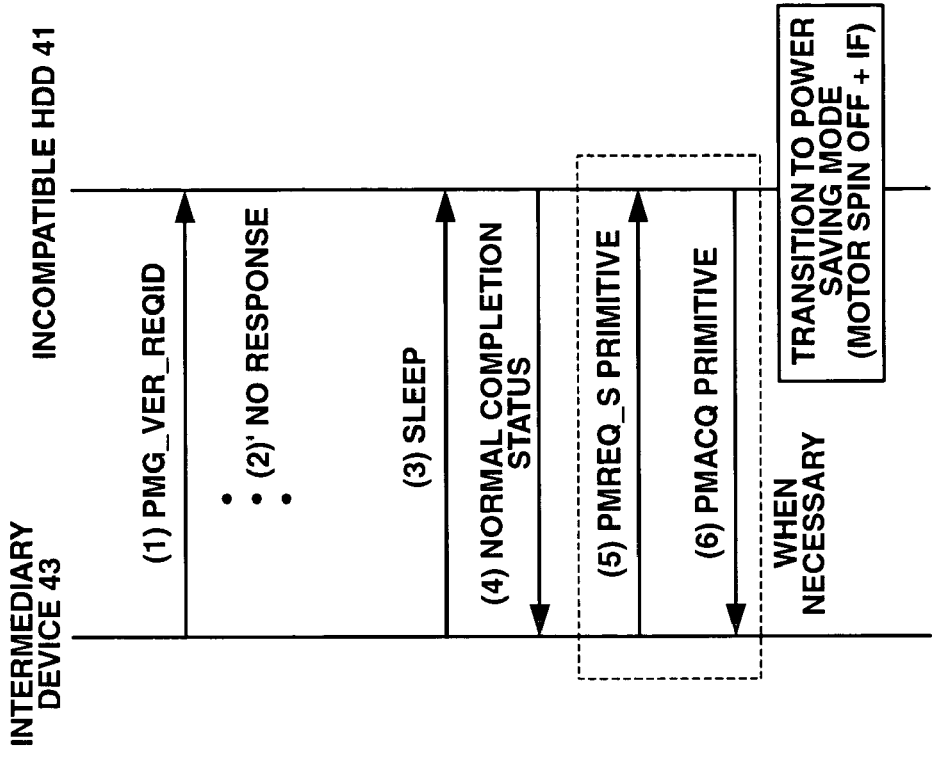
FIGS. 27A and 27B are views each illustrating an example of identification processing of a power saving method of storage apparatus of an embodiment of the present invention.
Figure 27B:
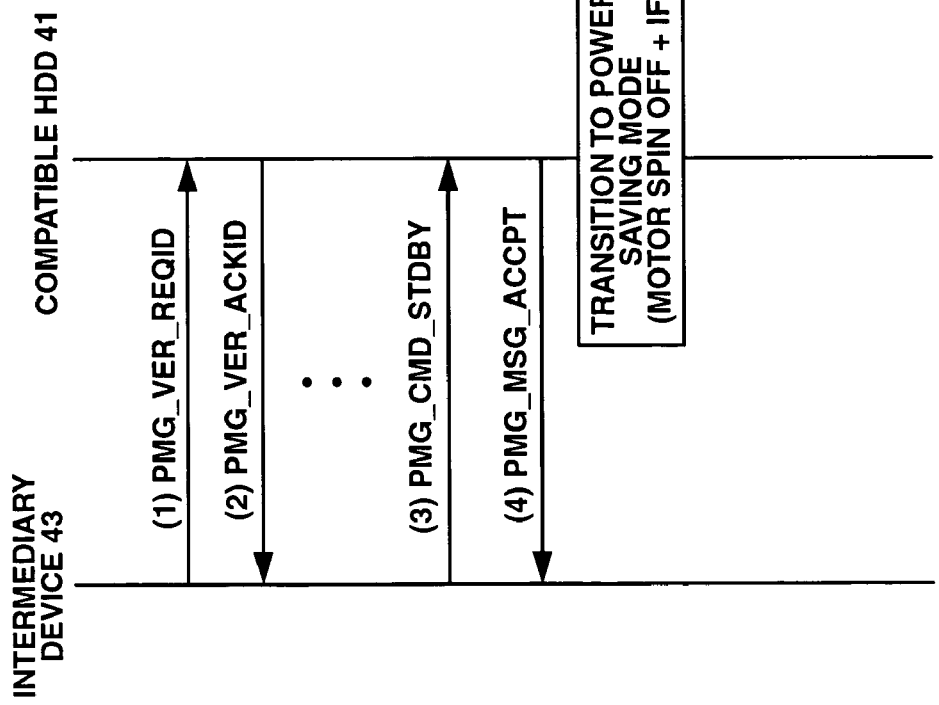

Further, FIG. 27(a) and FIG. 27(b) are views illustrating an example of identification processing of a power saving control method of the storage apparatus 4 of an embodiment of the present invention. Specifically, FIG. 27(a) is power saving control for a SATA disk device 41b compatible with power management ordered sets, and FIG. 27(b) is power saving control for a SATA disk device 41b that is not compatible with power management ordered sets. In this example, a power saving mode that stops a spindle motor and puts an interface line to inactive is selected.

Referring to FIGS. 27(a) and (b), the intermediary device 43 first sends a version mediation command for issuing use "PMG_VER_REQID" to the disk device 41 and awaits the arrival of a response message until a predetermined time elapses ((1) of FIGS. 27(a) and (b)). When a response version mediation message "PMG_VER_ACKID" within a predetermined time ((2) of FIG. 27(a)), the intermediary device 43 deems the disk device 41 on the opposing side compatible with a power management ordered set power saving control method and, for example, sends a motor spin off command ((3) of FIG. 27(a)). In this example, the motor spin off command "PMG_CMD_SLEEP" is transmitted. In response to this, the disk device 41 sends a command receipt response message "PMG_MSG_ACCPT" ((4) of FIG. 27(a)), and thereafter makes a transition to power saving mode.

In contrast, when there is no response within a predetermined time ((2) of FIG. 27(b)), a motor stopping command "SLEEP" is transmitted ((3) of FIG. 27(b)). In response to this, the disk device 41 sends a normal completion status ((4) of FIG. 27(b)), and thereafter makes a transition to power saving mode.

When it is determined that the interface line has not gone inactive, the intermediary device 43 may issue a predefined primitive command.

Third Embodiment

Described below is power saving control of storage apparatus 4 where a plurality of disk devices 41 are configured with redundancy in a disk array for preventing the system from going down as a result of faults, etc. For example, RAID technology is well-known as such a redundant configuration.

Disk devices 41 compatible with this redundant configuration are typically provided with a pair of ports (i.e., dual ports) for duplicating data paths. Therefore, even when one of the disk devices 41 receives a request for a transition to power saving mode from one intermediary device 43 at one of the dual ports, the interface line of the disk device 41 is only put to inactive, and the spindle motor cannot be made to stop, with the limitation that a request for a transition to power saving mode is not received at the other dual port. Because of this, the disk device 41 simply only partially contributes to power saving, and power saving cannot be effectively carried out. Further, power saving mode transition conditions are set each intermediary device 43. Thus, the intermediary device 43 therefore only carries out power saving control for disk devices 41 connected thereto. Therefore, if the minimum number of active devices is set to three at each intermediary device 43, looking from one intermediary device 43, this condition is satisfied, but looking from the redundantly configured system as a whole, at a maximum, there are cases where twice as many as disk devices 41 are operating.

In this embodiment, when the disk device 41 receives a request for a transition to power saving mode from one intermediary device 43 at one dual port, a message is transferred to the other intermediary device 43 in such a manner as to issue a request for a transition to power saving mode. The other intermediary device 43 that receives the request for a transition to power saving mode then determines whether or not there is matching with the power saving mode transition conditions, and when matching, the disk device 41 is put to power saving mode. As a result, it is possible for disk devices 41 operating as an overall system to efficiently carry out power saving.

Figure 28:
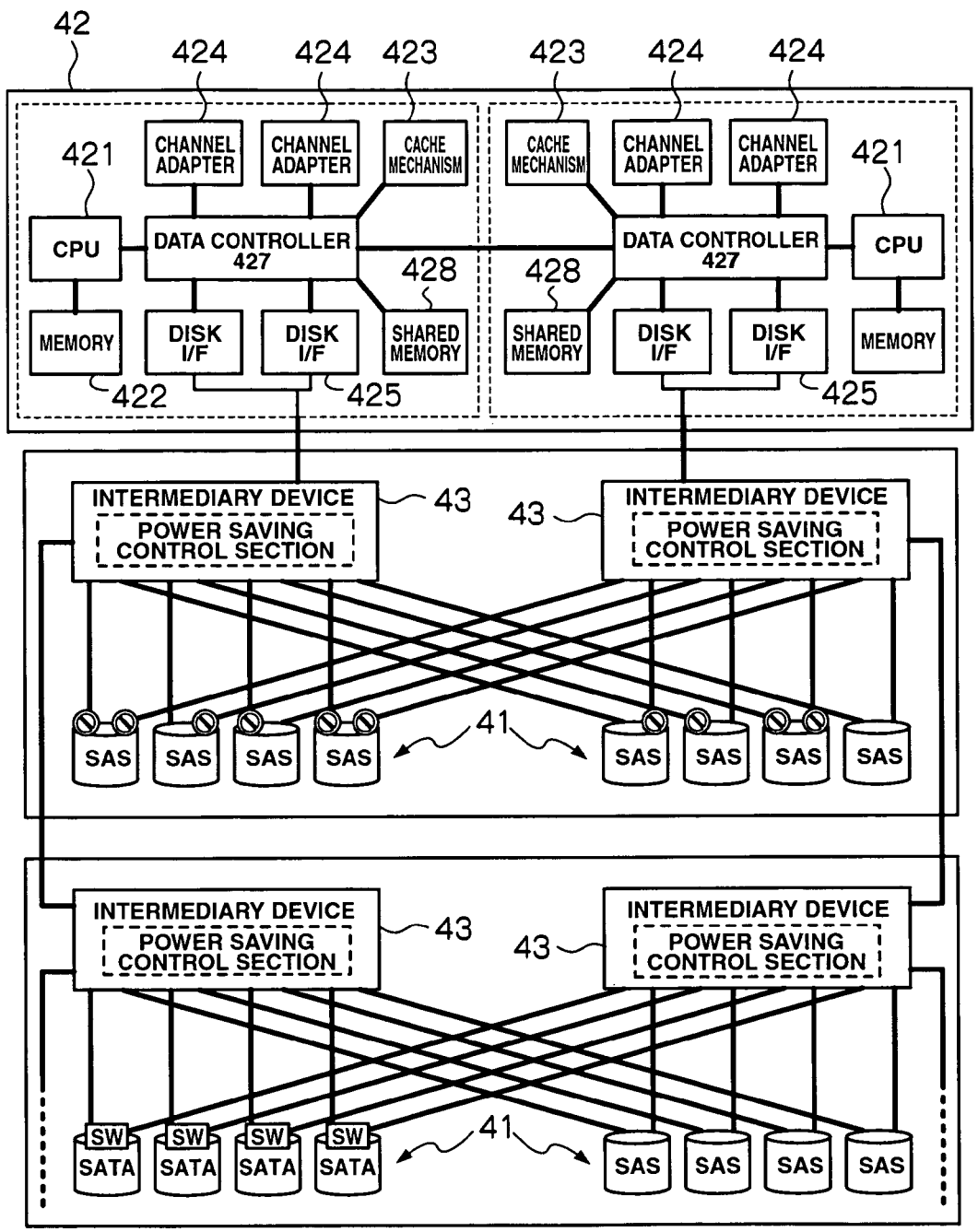
FIG. 28 is another view showing a configuration for storage apparatus of an embodiment of the present invention.

FIG. 28 is a view showing a configuration for the storage apparatus 4 of an embodiment of the present invention. As shown in FIG. 28, the controller unit 42 adopts a dual configuration that is mutually connected via data controllers 427. The controller unit 42 includes a shared memory 428. Each controller unit 42 includes two disk interfaces 425. Each disk interface 425 is respectively connected to intermediary devices 43a1 and 43b1, and each intermediary device 43a1 and 43b1 is further respectively connected to other intermediary devices 43a2 and 43b2.

The intermediary devices 43 include power saving control units and are configured so as to be capable of carrying out power saving control on disk devices 41 connected under their control. The disk devices 41 include dual ports, which are connected to a pair of intermediary devices 43. The disk devices 41 having dual ports of the disk devices 41 adopted in this embodiment are SAS disk devices 41a, whereas the SATA disk devices 41b typically only have single ports. Thus, as described in the following, the SATA disk device 41b can be seen to be a disk device having a dual port by using one SATA disk device 41b mounted with a port adapter and by using two SATA disk devices 41b mounted with a port multiplier on a port adapter.

In this embodiment, as shown in FIG. 29, two power management ordered sets are newly defined in order to implement effective power saving control of the disk devices 41 of a redundant configuration. The new power management ordered sets are an other system confirmation message "PMG_MSG_SLEEP" and a denial response message "PMG_MSG_ADNEY".

Figure 30:
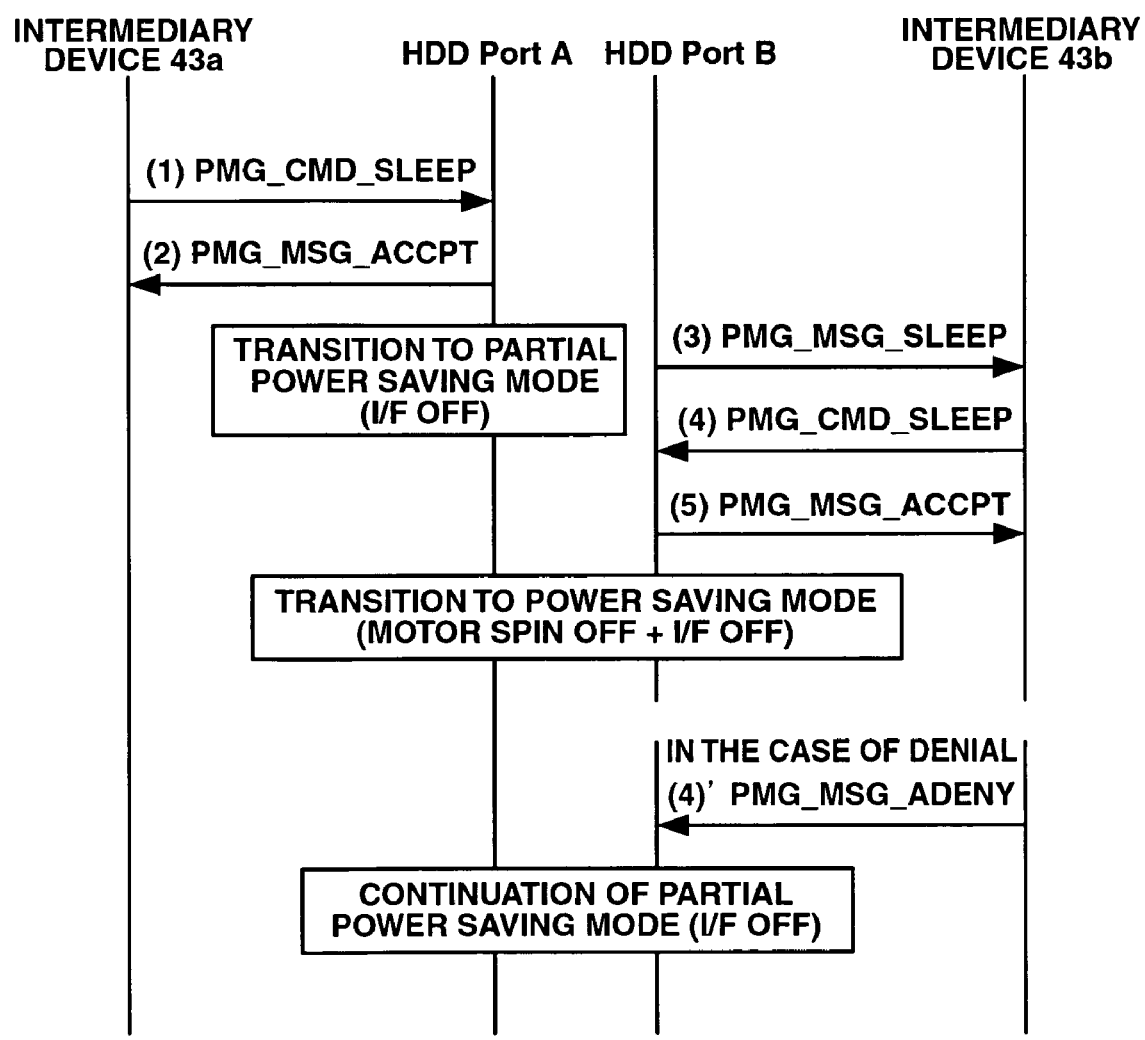
FIG. 30 is a flowchart illustrating processing at the time of a request to change to power saving mode for storage apparatus of an embodiment of the present invention.

FIG. 30 illustrates the flow of processing at the time of a request to change to power saving mode for the storage apparatus 4 of an embodiment of the present invention.

Referring to FIG. 30, one of the intermediary devices 43a sends a power saving mode transition request command (for example, PMG_CMD_SLEEP) to disk devices 41 under its control ((1) of FIG. 30). When the command is received at one of the ports (for example, port A), the disk device 41 sends a command receipt response message ((2) of FIG. 30) and the interface line is put to inactive. The disk device 41 then sends an other system confirmation message "PMG_MSG_SLEEP" to the intermediary device 43b via the other port (for example, port B) ((3) of FIG. 30).

Upon receiving the other system confirmation message, the intermediary device 43b determines whether or not the disk device 41 conforms to the power saving mode transition conditions. In the case of the determination of matching, a power saving mode transition request command is transmitted ((4) of FIG. 30)).

Upon receiving the power saving mode transition request command from port B, the disk device 41 sends back a command receipt response message ((5) of FIG. 30). In this case, the disk device 41 makes the spindle motor spin off because a command to put the interface line to inactive is received from both ports.

On the other hand, the intermediary device 43b receives the other system confirmation message. When it is determined that the disk device 41 does not conform to the power saving mode transition conditions, sends a denial response message ((4)' of FIG. 30)). In this case, the disk device 41 continues with a partial power saving mode state where the interface line only is put to inactive for the port A, without stopping the spindle motor.

Figure 31:
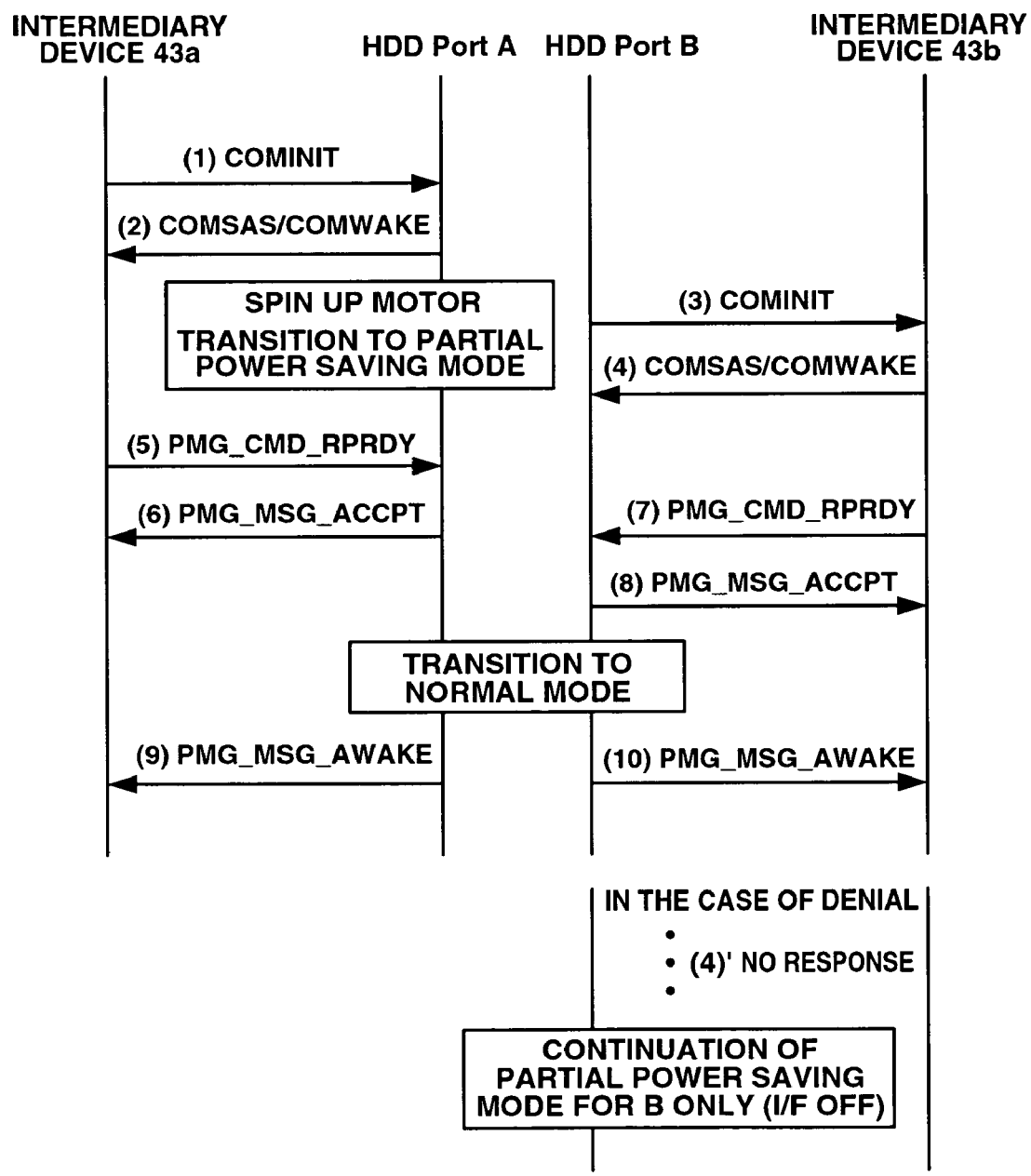
FIG. 31 is a flowchart illustrating processing at the time of a request to change to normal mode for storage apparatus of an embodiment of the present invention.

FIG. 31 illustrates the flow of processing at the time of a request to change to normal mode for the storage apparatus 4 of an embodiment of the present invention.

For example, as shown in FIG. 31, one intermediary device 43a receiving an I/O access request from the controller unit 42 first sends "COMINIT" that is an OOB signal ((1) of FIG. 31)). An OOB signal is a primitive handshake signal for between devices. Upon receiving the "COMINIT" signal, the disk device 41 responds using a "COMSAS/COMWAKE" signal ((2) of FIG. 31) and thus puts the interface line to active. The disk device 41 then sends a "COMINIT" signal to the other intermediary device 43b ((3) of FIG. 31).

The intermediary device 43b receiving the "COMINIT" signal then sends "COMSAS/COMWAKE" ((4) of FIG. 31). The intermediary device 43b that does not receive the I/O access request then does not respond using a "COMSAS/COMWAKE" signal because spin off up of the spindle motor is not necessary ((4)' of FIG. 31).

Further, the intermediary device 43a transmits a spin up notification request command "PMG_CMD_RPRDY" to port A corresponding to the disk device 41 ((5) of FIG. 31), and the disk device 41 sends a command receipt notification message "PMG_MSG_ACCPT" in response to this ((6) of FIG. 31). Similarly, the other intermediary device 43a transmits a spin up notification request command "PMG_CMD_RPRDY" to port B corresponding to the disk device 41 ((7) of FIG. 31), and the disk device 41 sends a command receipt notification message "PMG_MSG_ACCPT" in response to this ((8) of FIG. 31). It is not necessary for the exchange of these messages and commands to be at the same timing. When the spindle motor is spun up and a transition is made to normal mode, the disk device 41 sends a spin up notification response message "PMG_MSG_AWAKE" from both port A and port B ((9) of FIG. 31).

As described above, according to this embodiment, unnecessary awaiting of the disk device 41 for a state transition is prevented to as great an extent as possible. Further, an intermediary device 43 is capable of recognizing the presence of another port system of intermediary device 43. It is therefore possible for the intermediary device 43 receiving an other system confirmation message "PMG_MSG_SLEEP" to perform synchronization control of the minimum number of driven items by operating so as to track power saving of the intermediary device 43 that is the transmission source.

Figure 32A:
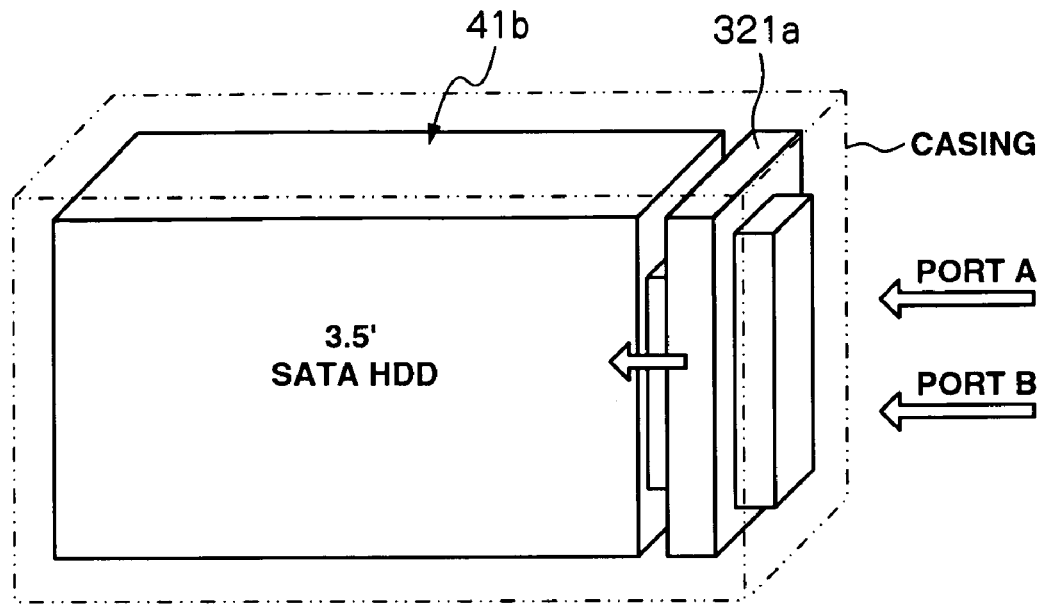
FIGS. 32A and 32B are views each showing an example of mounting a port adapter board on a SATA disk device of an embodiment of the present invention.
Figure 32B:
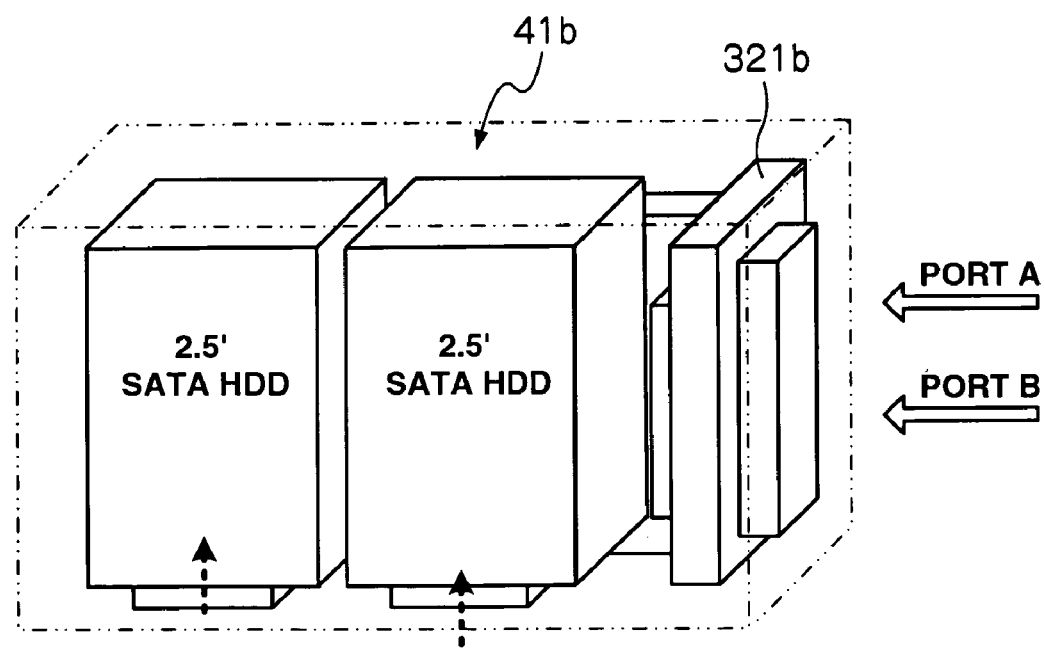

In this embodiment, when a single port SATA disk device 41b is adopted, for example, as shown in FIG. 32(a), a port switching adapter board 321a and disk device 41b are mounted within the casing of the disk device body. The port switch adapter 321a includes a dual port (ports A and B), with a switching function for switching over these ports being built in. As a result, it is possible for one SATA disk device 41b to be viewed as functioning as a dual port. Further, when two SATA disk devices are adopted, for example, as shown in FIG. 32(b), it is appropriate to mount port multiplier (PM) controller 321b on the port adapter. By way of this, it is possible for two SATA disk devices 41b to be viewed as functioning as a dual port. This port switching adapter board 321a and port multiplier (PM) controller 321b are mounted as functions corresponding to the power management ordered sets for power saving control described above.

Figure 33:
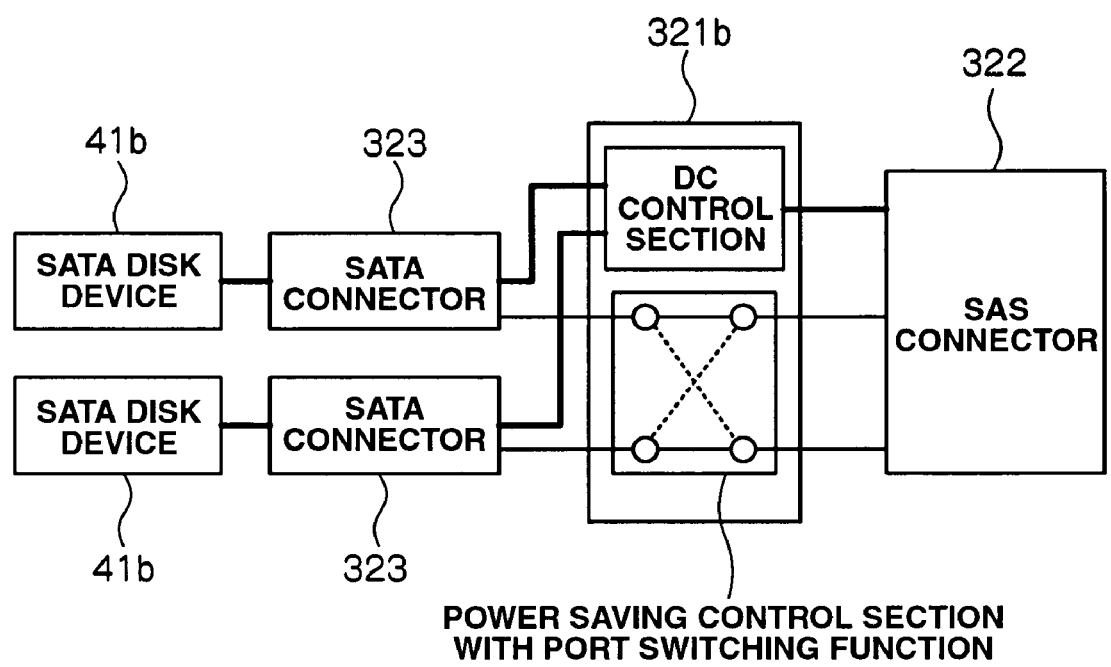
FIG. 33 is a view illustrating a SATA disk device of an embodiment of the present invention.

FIG. 33 is a view illustrating the SATA disk device 41b of an embodiment of the present invention. As shown in FIG. 33, the port multiplier (PM) controller 321b is arranged between the SAS connector 322 and the SATA connector 323. As a result, two SATA disk devices 41b can be seen as functioning as disk devices 41 with two ports. For example, 2.5 inch disk drives can be adopted as the two SATA disk devices 41b.

The intermediary device 43 is capable of implementing a redundant configuration by identifying an own system port of the port multiplier (PM) controller 321b as "0" and an other system port as "1". A two-system path can be directly allocated to each SATA disk device 41b. The intermediary device 43 is capable of accessing a SATA disk device 41b of another system using a path switching operation.

Further, a port switching mechanism may be configured in such a manner that data inputted from one port is duplicated at another port. In this case, the two SATA disk devices 41b operate as a mirroring disk so that, for example, the output of a disk device with a fast response speed is selected for read access requests.

Furthermore, the port switching mechanism may be configured so as to switch over a port switch using a signal from outside. Alternatively, this may correspond to redundancy of data by the controller unit 42.

Moreover, the port multiplier (PM) controller 321b is equipped with a time difference power supply switch. The time difference power supply switch supplies power to the two SATA disk devices 41b after allowing a predetermined time difference to pass.

In addition to the power saving control described previously, the SATA disk device 41b in this embodiment may also carry out power saving control by putting the switch for the port switching adapter board 321a and the port multiplier (PM) controller 321b ON and OFF. It is therefore also possible for power saving control to also be carried out for SATA disk devices 41b that cannot understand power management ordered sets via the port switching adapter board 321a and the port multiplier (PM) controller 321b.

Fourth Embodiment

The storage apparatus 4 of this embodiment is equipped with an advanced intermediary device 43A that has control over a conventional intermediary device 43' that does not have a power saving control function.

Figure 34:
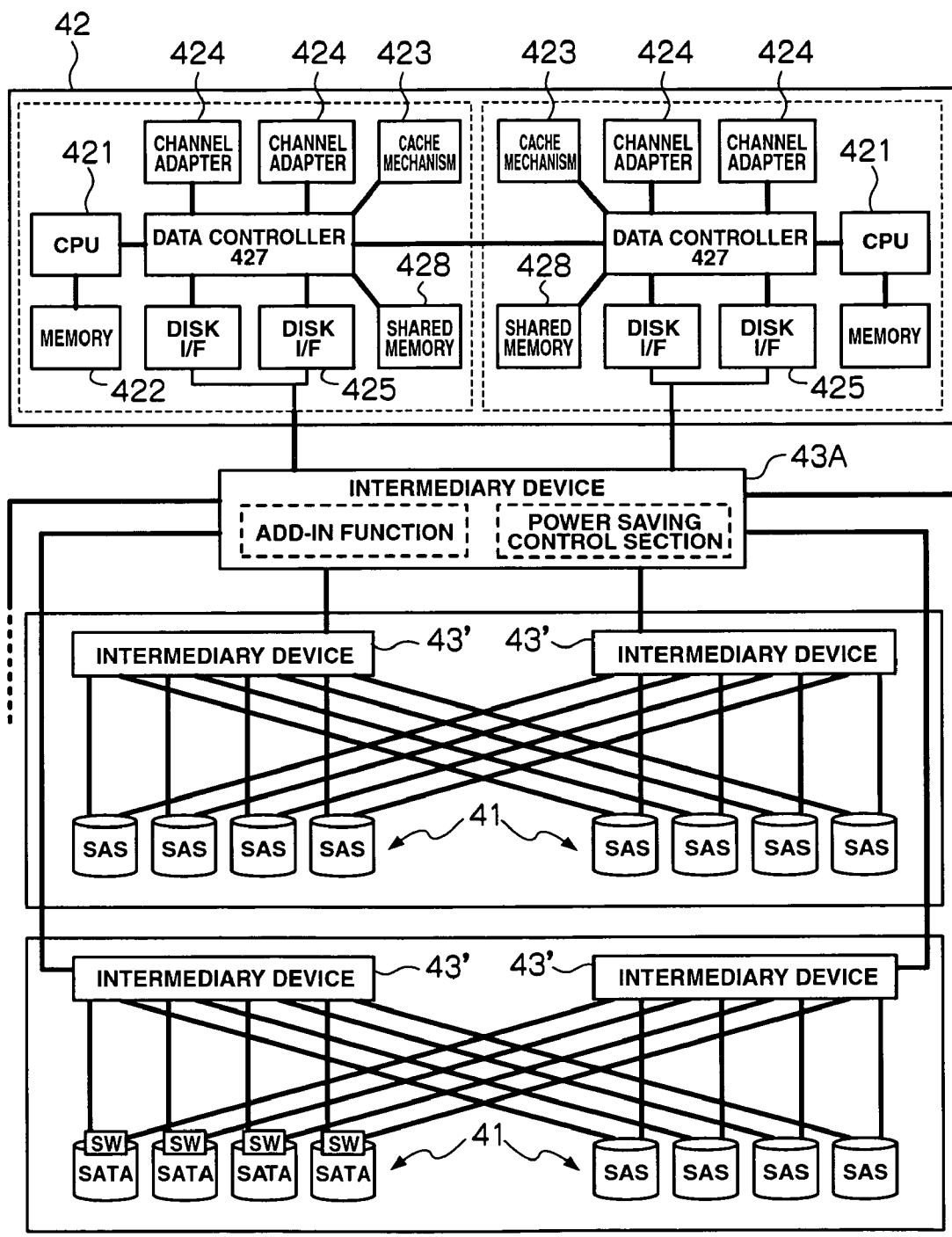
FIG. 34 is another view showing a configuration for storage apparatus of an embodiment of the present invention.

FIG. 34 is a view showing a configuration for the storage apparatus 4 of an embodiment of the present invention. In this embodiment also, the disk device 41 adopts a redundant configuration. Referring to FIG. 34, the intermediary device 43A is operatively connected between the controller unit 42 and the disk devices 41. The intermediary device 43A is operatively connected in parallel with a plurality of intermediary devices 43'. In addition to the power saving mode transition conditions, the intermediary device 43A can set a power saving operation policy. The power saving operation policy, for example, contains rules for switching power saving mode transition conditions in operation with usage conditions and a calendar function. For example, the operation policy may be that power saving mode is changed to at times when operation stops and normal mode is changed to at times when operation restarts.

Figure 35:
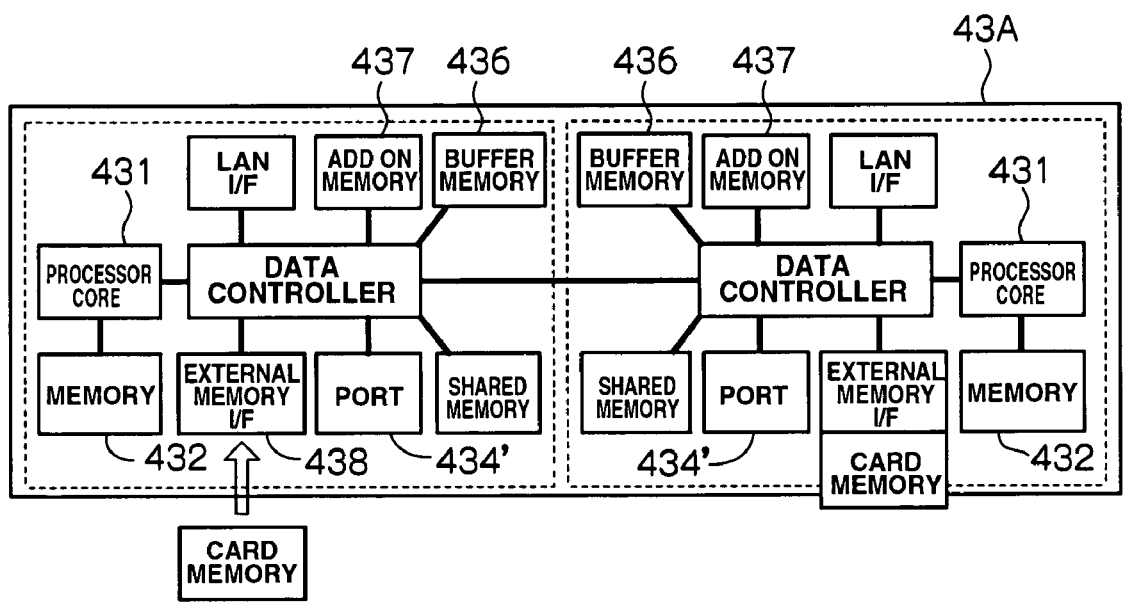
FIG. 35 is a further view showing a configuration for an intermediary device of an embodiment of the present invention.
Figure 36:
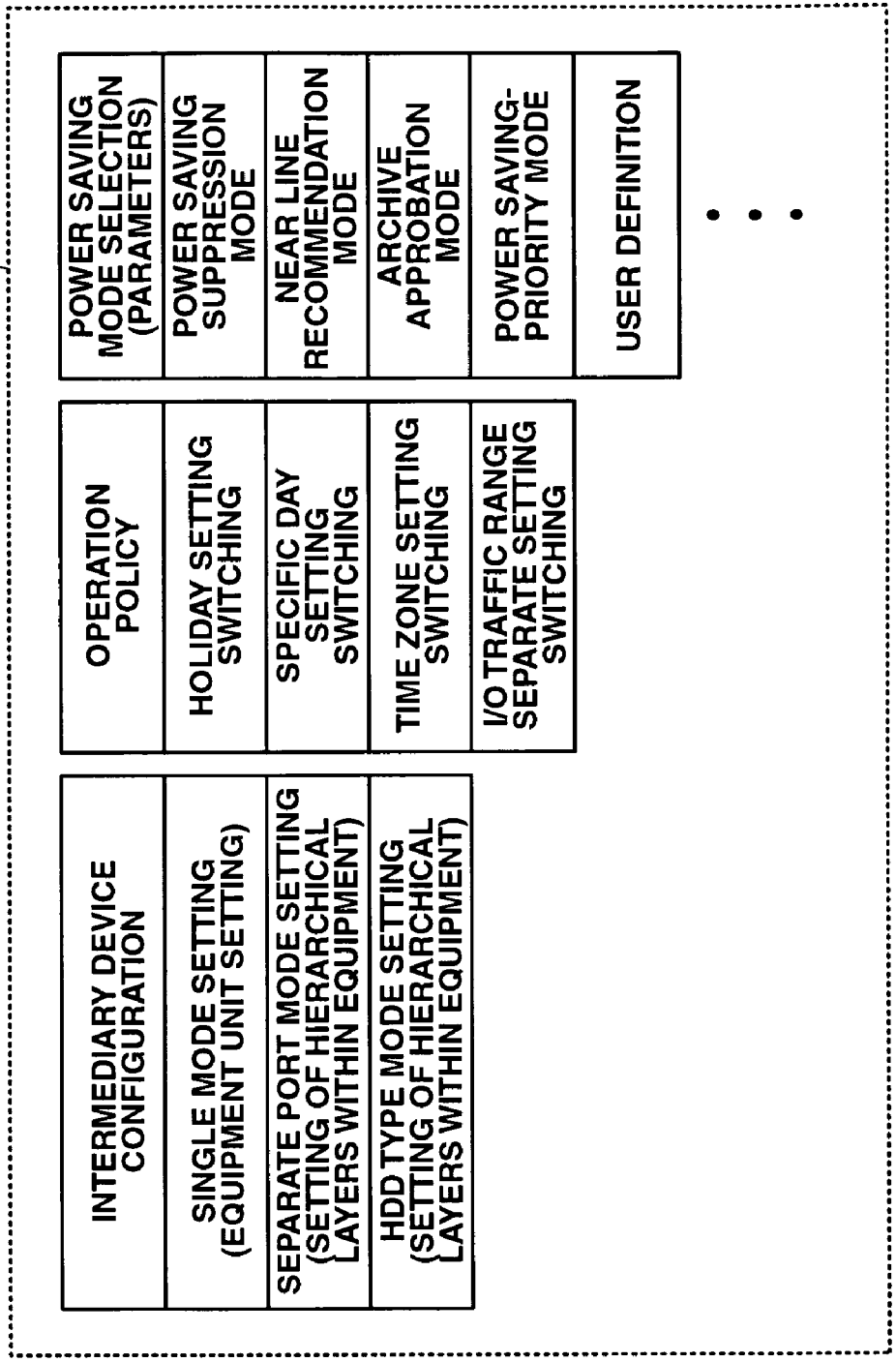
FIG. 36 is a view illustrating an example of power saving operation policy information stored in memory of the intermediary device of an embodiment of the present invention.

FIG. 35 is a view showing a configuration for the intermediary device 43 of an embodiment of the present invention. As shown in FIG. 35, the intermediary device 43A is configured from two system circuits so as to be compatible with a redundant configuration. As described above, the intermediary device 43A is mounted as a function corresponding to the power management ordered sets for power saving control. An add-on memory 437 is memory provided taking into consideration expandability of the system. As shown in FIG. 36, the add-on memory 437 stores profiles for information etc. relating to intermediary device configuration, the power saving operation policy, and power saving mode selection. The intermediary device configuration information includes the configuration and mode setting etc. for the intermediary device 43' that is connected under its control. Mode setting indicates, for example, a mode for whether setting is in intermediary device units, port units, or disk device type units. Power saving operation policy information includes a policy for switching settings based on, for example, holidays and specific days, time zone units, and I/O traffic, etc. Power saving mode selection includes various power saving modes such as a mode suppressing power saving and a mode giving priority to power saving. The system administrator may set these profiles directly to the advanced intermediary device 43A or from a controller 42. It is therefore possible to easily switch over the purpose of use of the storage system by setting these profiles appropriately, or to switch over power saving mode in accordance with a calendar or service conditions. The transition wait time between power saving mode and normal mode can therefore be made shorter, prolongation at the time of restarting is possible, and power saving effects due to effective operation of the system can be anticipated.

Returning to FIG. 35, an external memory interface 438 is an interface for connecting, for example, a detachable card-type non-volatile memory. The intermediary device 43 can utilize non-volatile memory connected to the external memory interface 438 as buffer memory. By way of this, memory capacity can be flexibly selected according to utilization conditions.

An extension port 434' is for connecting with the controller unit 42 and other equipment (i.e., the intermediary device 43' and the disk devices 41, etc.).

The intermediary device 43A includes a function for collecting SMART information for each disk device 41. The intermediary device 43 estimates the timing of the next disk device start up operation based on the collected SMART information and suppresses the issuance of unnecessary confirmation response commands. Further, the intermediary device 43 invites a retry at the controller unit 42 by issuing a Queue Full status command in accordance with this prediction so as to prevent timeout of the controller unit 42.

In this embodiment, the conventional intermediary device 43' is connected under the control of the advanced intermediary device 43A, but the intermediary device 43 as described in the embodiments may also be provided. In this case, the advanced intermediary device 43A carries out setting of each of the lower order intermediary devices 43 in accordance with power saving operation policy information. Further, when a data read request cached in the buffer memory 436 is received from the controller unit 42 while the disk device 41 is spinning up, the intermediary device 43A of this embodiment may adopt a configuration where the cached data is sent to the controller unit 42. Such caching operation may be implemented as a result of existing metadata being held in the intermediary device 43. When the desired data is not cached, the read request is held in the buffer memory 436 until the disk device 41 that is the target spin up.

Further, the extension port 434' of the intermediary device 43 may be configured to monitor the I/O access volume (I/O traffic volume) of each port. The intermediary device 43A outputs a report relating to operating conditions for each port to the management terminal 5 based on the I/O access volume. This is conducive to the system administrator making references during setting of the power saving operation policy.

Advantages of the Embodiments

Several advantages result from a storage system according to the present invention, some of which have been discussed above.

According to the embodiments, an intermediary device positioned between a controller unit and disk devices carries out power control for disk devices. It is therefore possible for the controller unit to achieve dedication to original processing accompanying the I/O access requests, carrying out of just the minimum necessary communication between the controller unit and the intermediary device is sufficient, and reduction of processing performance of the controller unit therefore does not occur. Further, it is not necessary to separately load memory required by the processing because it is not necessary for the controller unit to carry out processing relating to power control, and system costs can be kept relatively low by carrying out the processing at the intermediary device.

Further, the intermediary device puts predetermined disk devices into power saving mode in accordance with predetermined power saving mode transition conditions and is therefore capable of carrying out power control effectively. In particular, in the above embodiments, disk devices for which there is not a predetermined volume of I/O access requests go into power saving mode even when there is an I/O access request within a fixed time. This makes it possible to make further power savings. Moreover, it can also be considered to decide the minimum number of driven items and have the disk devices operate in such a manner that there is no marked reduction in performance such as responsiveness, etc.

Further, time is required until a steady state is reached by a spindle motor of a disk device when a disk device in power saving mode goes into normal mode. Therefore, regarding the fear of data loss accompanying delay processing of the write target data, loss of data is prevented by a mechanism for protecting delayed write data.

Further, according to the embodiments described above, the intermediary device and disk devices communicate using primitive signals. A mechanism for interpreting commands of a layer of a higher order protocol stack is therefore not required, and implementation is possible in a straightforward manner by simply partially adding or changing software. It is therefore possible for the scale of the circuit system to be made small.

Further, according to the embodiments, the intermediary devices can be made compatible with disk devices of redundant configurations and it is therefore possible to configure a system in a flexible manner.

The present invention may be broadly applied to storage apparatus storing data processed on a computer system. In particular, the present invention prevents data loss and is therefore particularly appropriate to application in storage apparatus used in back-up, restoration and recovery of data.

While the invention has been described with respect to a limited number of embodiments, those who skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage apparatus for storing data, comprising:
    a controller unit to carry out processing according to an access request from a host computer;
    a plurality of intermediary devices connected to the controller unit and having a plurality of ports;
    and a plurality of disk devices including first disk devices and second disk devices, connected respectively to the plurality of ports of each of the plurality of intermediary devices, wherein the first disk devices are connected respectively to a plurality of ports of a first intermediary device included in the plurality of intermediary devices;
    and wherein the second disk devices are connected respectively to a plurality of ports of a second intermediary device included in the plurality of intermediary devices;
    wherein said first intermediary device stores first management information indicating whether an operating mode of each of the first disk devices that are connected thereto is a power saving mode, wherein said second intermediary device stores second management information indicating whether an operating mode of each of the second disk devices that are connected thereto is a power saving mode, and wherein, upon receipt of an I/O request sent from the controller unit to a first disk device A of the first devices, each of the plurality of the first-intermediary device determines whether the operating mode of the first disk device A is a power saving mode based on the first management information, and sends a command for spin-up to the first disk device A if the operating mode of the first disk device A is a power saving mode, wherein a threshold value is set to each of the intermediary devices, and
    wherein each of the intermediary devices sends a command for spin-down to one of the disk devices connected thereto if elapsed time after an I/O request to the one of disk devices exceeds the threshold value.

2. The storage apparatus according to claim 1, wherein the plurality of disk devices comprises a first disk device group, and a second disk device group having different performance with respect to the first disk device group.

3. The storage apparatus according to claim 2, wherein the first
    disk device group comprises SAS specification hard disk devices and the second disk device group comprises SATA specification hard disk devices.

4. The storage apparatus according to claim 1, wherein each of the plurality of intermediary devices includes a profile relating to predetermined power management, and the first disk device A is controlled to make a transition to a power saving mode by a power control carried out in accordance with power saving mode transition conditions defined in the profile relating to the predetermined power management.

5. The storage apparatus according to claim 4, wherein each of
    the plurality of intermediary devices further comprises a port management table containing state parameters respectively for the plurality of ports, and
    wherein the power control is carried out for the plurality of disk devices respectively connected to the plurality of ports in accordance with the port management table.

6. The storage apparatus according to claim 5, wherein each of the plurality of intermediary devices selects one or more ports that have not had an access request for equal to or more than a predetermined period of time indicated in the power saving mode transition conditions by referring to the port management table, and puts one or more disk devices connected to the selected the one or more ports into a power saving mode.

7. The storage apparatus according to claim 5, wherein each of the plurality of intermediary devices selects one or more ports with less than or equal to a predetermined access request amount indicated in the power saving mode transition conditions by referring to the port management table, and puts one or more disk devices connected to the selected one or more ports into a power saving mode.

8. The storage apparatus according to claim 5, wherein, when a number of disk devices in a power saving mode by the power control is equal to a minimum number of active drives indicated in the power saving mode transition conditions, the at least one intermediary device selects a port that has reached a restart time indicated in the power saving mode transition conditions by referring to the port management table and spins up a disk device connected to the port that has reached a spin up time.

9. The storage apparatus according to claim 1, wherein each of the plurality of intermediary devices causes disk devices that are in a power saving mode by the power control to make a transition to a normal mode in accordance with normal mode transition conditions.

10. The storage apparatus according to claim 9, wherein, when an access request is issued for the first disk device A when that device is in a power saving mode, the first intermediary device sends the access request to the first disk device A after putting the disk device A into normal mode.

11. The storage apparatus according to claim 10, wherein the controller unit carries out processing to maintain a session with the first intermediary device in accordance with a predetermined timeout interval during the time until the first intermediary device puts the first disk device A in a power saving mode into normal mode.

12. The storage apparatus according to claim 10, wherein the controller unit further comprises a cache memory, and
    wherein the access request is held in the cache memory for the time until the first disk device A in a power saving mode is put into a normal mode by the first intermediary device and thereby the access request is sent to the first disk device A.

13. The storage apparatus according to claim 10, wherein each of the plurality of intermediary devices further comprises a buffer memory, and
    wherein the access request is held in a buffer memory for the time until the first disk device A in a power saving mode is put into a normal mode and thereby the access request is sent to the first disk device A.

14. The storage apparatus according to claim 10, wherein the first intermediary devices holds the access request in the first disk device A in the normal mode for a time until the first disk device A in a power saving mode is put into a normal mode and the thereby held access request is sent to the disk device A.

15. The storage apparatus according to claim 10, wherein each intermediary device further comprises a non-volatile external storage,
wherein the access request is held in the external storage for a time until the first disk device A in a power saving mode is put into a normal mode and thereby the access request is sent to the first disk device A.

16. The storage apparatus according to claim 1, wherein each of the plurality of intermediary devices carries out the power control for the plurality of disk devices using a power management ordered set belonging to a protocol layer defining a primitive pulse communication.

17. The storage apparatus according to claim 1, wherein each of the plurality of intermediary devices carries out the power control for the plurality of disk devices using an out of band signal belonging to a protocol layer defining a primitive pulse communication.

18. A storage apparatus for storing data, comprising:
a controller unit carrying out at least processing according to an access request from a host computer;
a plurality of disk devices, including first disk devices and second disk devices, configured redundantly;
and a plurality of intermediary devices, including a first intermediary device and a second intermediary device, each having a plurality of ports adapted for a redundant configuration and connecting the controller unit and the redundantly configured plurality of disk devices,
wherein the first disk devices are connected respectively to a plurality of ports of a first intermediary device included in the plurality of intermediary devices;
and wherein the second disk devices are connected respectively to a plurality of ports of a second intermediary device included in the plurality of intermediary devices;
wherein a said first intermediary device stores first management information indicating whether the operating mode of each of the plurality of disk devices that is connected thereto is a power saving mode, and wherein said second intermediary stores second management information indicating whether an operating mode of each of the second disk devices that are connected thereto is a power saving mode, and wherein, upon receipt of an I/O request sent from the controller unit to a first disk device A of the first disk devices, the first intermediary device determines whether the operating mode of the first disk device A is a power saving mode based on the first management information, and sends a command for spin-up to the first disk device A if the operating mode of the first disk device A is a power saving mode, wherein a threshold value is set to each of the intermediary devices, and
wherein each of the intermediary devices sends a command for spin-down to one of the disk devices connected thereto if elapsed time after an I/O request to the one of disk devices exceeds the threshold value.

19. The storage apparatus according to claim 18, wherein the disk device connected to the port selected in accordance with an access request makes a request so as to carry out power control for a second intermediary device corresponding to the first intermediary devices.

* * * * *